US009671531B2

(12) United States Patent
Shirai et al.

(10) Patent No.: US 9,671,531 B2
(45) Date of Patent: Jun. 6, 2017

(54) THERMOPLASTIC RESIN COMPOSITION FOR LIGHT REFLECTOR, FORMED ARTICLE FOR LIGHT REFLECTOR, LIGHT REFLECTOR, AND METHOD FOR PRODUCING FORMED ARTICLE FOR LIGHT REFLECTOR

(71) Applicant: Mitsubishi Rayon Co., Ltd., Chiyoda-ku (JP)

(72) Inventors: Yasunori Shirai, Toyohashi (JP); Haruo Ueda, Toyohashi (JP); Tamae Takagi, Toyohashi (JP)

(73) Assignee: Mitsubishi Rayon Co., Ltd., Chiyoda-ku (JP)

( * ) Notice: Subject to any disclaimer, the term of this patent is extended or adjusted under 35 U.S.C. 154(b) by 18 days.

(21) Appl. No.: 14/018,720

(22) Filed: Sep. 5, 2013

(65) Prior Publication Data
US 2014/0029122 A1    Jan. 30, 2014

Related U.S. Application Data

(63) Continuation of application No. 10/569,104, filed as application No. PCT/JP2004/012605 on Aug. 25, 2004, now Pat. No. 8,569,403.

(30) Foreign Application Priority Data

| Aug. 26, 2003 | (JP) | 2003-301606 |
| Aug. 26, 2003 | (JP) | 2003-301613 |
| Dec. 26, 2003 | (JP) | 2003-434916 |
| Aug. 13, 2004 | (JP) | 2004-235995 |

(51) Int. Cl.
*C08K 3/02* (2006.01)
*G02B 5/08* (2006.01)
*B29C 45/00* (2006.01)
*B29C 45/37* (2006.01)
*C08K 5/103* (2006.01)
*G02B 1/04* (2006.01)
*B29K 67/00* (2006.01)
*B29L 11/00* (2006.01)
*B29L 31/00* (2006.01)

(52) U.S. Cl.
CPC ........ *G02B 5/0866* (2013.01); *B29C 45/0001* (2013.01); *B29C 45/0013* (2013.01); *B29C 45/37* (2013.01); *C08K 5/103* (2013.01); *G02B 1/04* (2013.01); *B29C 45/0053* (2013.01); *B29C 2045/0079* (2013.01); *B29K 2067/00* (2013.01); *B29L 2011/0083* (2013.01); *B29L 2031/747* (2013.01)

(58) Field of Classification Search
CPC .................. C08K 9/04; C08K 3/24
USPC .................. 524/80, 401; 362/341
See application file for complete search history.

(56) References Cited

U.S. PATENT DOCUMENTS

| 4,199,421 | A |  | 4/1980 | Kamada et al. |
| 4,623,562 | A |  | 11/1986 | Breitenfellner et al. |
| 5,534,580 | A |  | 7/1996 | Mitsui et al. |
| 5,589,524 | A |  | 12/1996 | Ogita et al. |
| 5,710,856 | A | * | 1/1998 | Ishii ........................ B32B 27/20 |
|  |  |  |  | 362/623 |
| 5,833,889 | A |  | 11/1998 | Tanikita et al. |
| 5,985,465 | A | * | 11/1999 | Daichou et al. ............. 428/458 |
| 5,991,080 | A |  | 11/1999 | Kohta et al. |
| 6,607,794 | B1 |  | 8/2003 | Wilson et al. |
| 6,629,769 | B2 |  | 10/2003 | Kosugi et al. |
| 6,814,453 | B2 |  | 11/2004 | Miwa et al. |
| 8,569,403 | B2 | * | 10/2013 | Shirai ................ B29C 45/0001 |
|  |  |  |  | 362/341 |
| 2002/0075686 | A1 |  | 6/2002 | Kosugi et al. |
| 2004/0125603 | A1 |  | 7/2004 | Chundury et al. |
| 2004/0228146 | A1 |  | 11/2004 | Koyama et al. |
| 2005/0254259 | A1 |  | 11/2005 | Yamashita et al. |
| 2006/0172119 | A1 |  | 8/2006 | Hayashi et al. |

FOREIGN PATENT DOCUMENTS

| JP | 53-058183 |  | 5/1978 |
| JP | 61-21161 |  | 1/1986 |
| JP | 61-133234 | A | 6/1986 |
| JP | 62-240343 |  | 10/1987 |
| JP | 4-126745 |  | 4/1992 |
| JP | 06-063977 |  | 3/1994 |
| JP | 06-203613 |  | 7/1994 |
| JP | 8-264013 |  | 10/1996 |
| JP | 10-204185 |  | 8/1998 |
| JP | 11-29745 |  | 2/1999 |

(Continued)

OTHER PUBLICATIONS

Machine Translation of JP 2001-316573 (2001).*
Office Action issued Nov. 17, 2011, in Japanese Patent Application No. 2003-434916 with English translation.
Notification (Information Statement) dated Sep. 30, 2010 issued in the corresponding Japanese Patent Application No. 2003-434916.
Machine Translation of JP 2001316573.
Japanese Office Action issued Mar. 17, 2011, in Japan Patent Application No. 2004-235995 (with English translation).
Japanese Notice of Allowance issued Jun. 9, 2011, in Japan Patent Application No. 2004-235995 (with English translation).
Japanese Office Action issued Jun. 20, 2013 in Patent Application No. 2011-107058 with English Translation.

(Continued)

*Primary Examiner* — Hannah Pak
(74) *Attorney, Agent, or Firm* — Oblon, McClelland, Maier & Neustadt, L.L.P.

(57) ABSTRACT

Thermoplastic resin composition for a light reflector such as a housing, reflector, and extension of an automotive lamp, and a lighting fixture. The composition contains 2 to 45 parts by mass of an inorganic filler treated with a fatty acid type surface treating agent and has an average diameter of not more than 3 μm, per 100 parts by mass of a thermoplastic resin. The housing reflector made from such thermoplastic resin composition shows excellent surface smoothness, surface luster and surface image clarify.

7 Claims, No Drawings

(56) References Cited

FOREIGN PATENT DOCUMENTS

| | | |
|---|---|---|
| JP | 11-61382 A | 3/1999 |
| JP | 11-241006 | 9/1999 |
| JP | 11-339525 | 12/1999 |
| JP | 2000-19313 | 1/2000 |
| JP | 2000-34471 | 2/2000 |
| JP | 2000-035509 | 2/2000 |
| JP | 2001-81248 | 3/2001 |
| JP | 2001-287227 A | 10/2001 |
| JP | 2001-316573 | 11/2001 |
| JP | 2002-008420 | 1/2002 |
| JP | 2002020591 A | 1/2002 |
| JP | 2002-98811 | 4/2002 |
| JP | 2002-098811 | 4/2002 |
| JP | 2002-179895 | 6/2002 |
| JP | 2002-284957 | 10/2002 |
| JP | 2002-535731 | 10/2002 |
| JP | 2002294042 A | 10/2002 |
| JP | 2002-332396 | 11/2002 |
| JP | 2003-012903 | 1/2003 |
| JP | 2003-026905 | 1/2003 |
| JP | 2003-26908 | 1/2003 |
| JP | 2003-171564 | 6/2003 |
| JP | 2003-213144 | 7/2003 |
| JP | 2003-294921 | 10/2003 |
| JP | 2005-146103 | 6/2005 |
| JP | 2006-301578 | 11/2006 |
| WO | 00/46307 | 8/2000 |
| WO | WO 0046307 | 10/2000 |

OTHER PUBLICATIONS

Japanese Notification issued Jun. 9, 2011 in Patent Application No. 2003-434916 with English Translation.

Japanese Office Action issued Jul. 1, 2010 in Patent Application No. 2003-434916 with English Translation.

United Kingdom Search Report issued Jun. 29, 2007 in Patent Application No. 0703987.8.

International Search Report issued Dec. 14, 2004 in PCT/JP2004/012605.

* cited by examiner

THERMOPLASTIC RESIN COMPOSITION FOR LIGHT REFLECTOR, FORMED ARTICLE FOR LIGHT REFLECTOR, LIGHT REFLECTOR, AND METHOD FOR PRODUCING FORMED ARTICLE FOR LIGHT REFLECTOR

CROSS REFERENCE TO RELATED APPLICATIONS

This application is a continuation application of prior U.S. patent application Ser. No. 10/569,104, filed Feb. 22, 2006, the disclosure of which is incorporated herein by reference in its entirety. The parent application is the National Stage of PCT/JP04/12605, filed Aug. 25, 2004, the disclosure of which is incorporated herein by reference in its entirety. Both the parent application and the international application claim priority to Japanese Applications JP 2003-301606, filed Aug. 26, 2003, JP 2003-301613, filed Aug. 26, 2003, JP2003-434916, filed Dec. 26, 2003, and JP2004-235995, filed Aug. 13, 2004, the disclosures of which are incorporated herein by reference in their entireties.

BACKGROUND OF THE INVENTION

Technical Field

The present invention relates to a thermoplastic resin composition used for a light reflector such as a housing, reflector, and extension of an automotive lamp, and a lighting fixture, and relates to a light reflector itself in which a light reflecting metal layer is directly formed on the surface of a molded article produced from the thermoplastic resin composition. Further, the present invention relates to the findings that in an attempt to impart an excellent appearance to a light reflector in which a light reflecting metal layer is directly formed on the surface of a molded article, if the surface of a mold to be used for injection molding to produce a molded article was polished in advance with a surface polishing agent having a polishing count of 5,000 or more, or the surface of a mold was subjected in advance to a surface treatment such as chrome plating, the surface smoothness, surface luster, and surface image clarity of a molded article to be obtained are increased, and as the result, a light reflector having an excellent appearance after a vapor deposition or painting comes to readily be obtained.

The present application is a PCT application to which foreign priority benefits of Japanese patent application Nos. 2003-301606 and 2003-301613 filed on Aug. 26, 2003, Japanese patent application No. 2003-434916 filed on Dec. 26, 2003, and Japanese patent application No. 2004-235995 filed on Aug. 13, 2005 are claimed, and all teachings of those Japanese patent applications are incorporated herein by this specific reference thereto.

Background Art

Heretofore, a bulk molding compound (hereinafter abbreviated to BMC), which is a thermosetting resin, has been used as a material for a light reflector such as a reflector and extension used for an automotive lamp and others. Whereas the BMC is excellent in the heat stability and dimensional stability, it has problems that the molding cycle time is long, elimination of burrs requires much time and effort at the time of molding, and productivity is low. As a means for solving the problems, investigations as to a possibility of using a thermoplastic resin have been conducted.

In examples in which a thermoplastic resin is used, thermoplastic resin compositions prepared by blending various reinforcing materials with a crystalline resin typified by a polyester resin such as a polybutylene terephthalate and polyethylene terephthalate, or with a non-crystalline resin typified by a polycarbonate resin have specifically been used.

For instance, a method is proposed in which a composition prepared by using a polyethylene terephthalate resin as thermoplastic resin and blending inorganic fillers such as glass fibers and talc particles therewith as reinforcing material is used (see Laid-open Japanese patent publication No. Hei 6-203613).

In this method, however, it is necessary to smoothing the surface of a molded article by subjecting it to an undercoat treatment in advance of the formation of a light reflecting metal layer on the surface of the molded article, since the surface smoothness of the molded article is insufficient due to the inorganic fillers raised on the surface of the molded article or poor mold release characteristic (hereinafter, the term "mold release characteristics" is simply referred to as release characteristics). When the undercoat treatment is not performed, a mirror surface is not developed even if a light reflecting metal layer was formed, and thus a satisfiable light reflector can not be obtained. Besides, the performance of the undercoat treatment has such problems that an extra step becomes necessary, a treatment of a solvent for dissolving an undercoating material is required, an extra amount of energy is required since a step for drying a coated paint becomes necessary, and further a load imposed against the environment is large.

As a method in which such undercoat treatment is not required, a direct vapor deposition (direct deposition) method is proposed in recent years. In the direct deposition method, a light reflecting metal layer is directly formed on the surface of a molded article, without subjecting the surface of the molded article to an undercoat treatment, by directly vapor depositing a metal on the surface of a molded article or vapor depositing a metal on the surface of a molded article after the molded article was subjected to a plasma activating treatment. In this direct deposition method, an extent of smoothness of the surface of a molded article higher than that heretofore achieved has come to be sought, since a metal layer is directly formed on the surface of a molded article.

Further, there is a trend lately that a high-power lamp is used to increase the luminance. When a high-power lamp is used, the temperature in a head lamp is increased. Accordingly, a material to be used as a substrate of a reflector has come to be required to have a heat resistance of 160 to 180° C. However, as to a light reflector produced by the direct deposition method, a problem that a light reflecting metal layer tarnishes when the light reflector was used for a long time in an environment at such high temperature (that is, a problem of thermal tarnishing) is particularly remarkable. There are several type of phenomena of the thermal tarnishing. Specifically, (1) a phenomenon in which a metal layer is peeled off a substrate resin by a thermal deformation (reduction of the surface smoothness) of the substrate resin (orange peel like defect), (2) a phenomenon in which a substrate resin and a metal layer are peeled from each other or deformed by a gas generated by the thermal decomposition of the substrate resin (whitening), and (3) a phenomenon in which a substrate resin and a metal layer are peeled from each other or deformed by an exudation or bleeding of a component such as an additive contained in the substrate resin (whitening) can be mentioned.

In order to solve this problem, various attempts have been carried out. For example, a resin composition prepared by blending, as a reinforcing material, 3 parts by mass of talc particles which have an average particle diameter of 3 μm and surfaces of which is not treated, with 100 parts by mass of a thermoplastic resin composition comprising a polyalkylene terephthalate resin and a polycarbonate resin (see Laid-open Japanese patent publication No. Hei 11-241006) and a resin composition prepared by blending 12 to 25 parts by mass of talc particles treated with an epoxysilane and having an average particle diameter of 2.6 to 3.8 μm with 100 parts by mass of a polyester resin (see Laid-open Japanese patent publication NO. 2003-12903) are proposed. In addition, various other attempts have been carried out to solve the problem of the thermal tarnishing. For example, a resin composition prepared by blending an inorganic filler, antioxidant, and internal lubricant with a polybutylene terephthalate resin (see Laid-open Japanese patent publication 2000-35509) and a resin composition prepared by blending an inorganic reinforcing material and wax with a resin composition comprising a polybutylene terephthalate resin and polyalkylene naphthalate resin (see Laid-open Japanese patent publication No. 2002-179895) are proposed.

However, the resin composition disclosed in Japanese patent publication No. Hei 11-241006 has problems that the affinity between the resins and the inorganic filler is poor since the inorganic filler used as reinforcing material is not subjected to a surface treatment, the inorganic filler particles are easy to agglomerate together since they have such a very fine particle diameter as 0.3 μm, and the surface smoothness of a molded article to be obtained is not sufficient.

Resin composition disclosed in Laid-open Japanese patent publication No. 2003-12903 has a problem that the surface smoothness of a molded article is not sufficient since inorganic filler particles having a relatively large average particle diameter in the range for 2.6 to 3.8 μm are used as reinforcing material. Besides, since an epoxysilane is used in the resin composition as surface treating agent for the inorganic filler particles, the resin composition has another problem that unreacted epoxysilane is exuded or bled to the surface of a molded article at the time of molding to react the surface of a mold thereby deteriorate the release characteristics. As the result, a defect (release mark) is developed on the surface of a molded article due to the deteriorated release characteristics, and the release mark is transferred as it is on a light reflecting layer to produce a further defect when a light reflecting metal layer was directly formed on the surface of the molded article.

Resin compositions disclosed in Laid-open Japanese patent publication No. Hei 11-241006 or Laid-open Japanese patent publication No. 2003-12903 have a problem that the reflective appearance of a light reflector is dull when a light reflector is produced by directly forming a light reflecting metal layer on the surface of a molded article prepared by employing one of the resin compositions, since talc particles are used as reinforcing material.

Resin composition disclosed in Laid-open Japanese patent publication No. 2000-35509 is intended to repress the thermal tarnishing (whitening) by repressing the generation of a gas due to the thermal decomposition of a substrate polyester resin (phenomenon described in (2) above) by making the amount of terminal carboxyl groups less than a specified amount. However, whereas the resin composition disclosed in the patent publication 2000-35509 mentioned above has no problem when a small-sized and simple-shaped molded article such as a flat plate of 50 mm square is produced from the composition, a problem of a molding defect (defect in the surface smoothness of a molded article, development of a release mark, and others) is caused due to poor release characteristics when such a large-sized molded article having a complex and three dimensional shape as a reflector and extension is produced, since a releasing agent is not contained as a component in the resin composition.

Resin composition disclosed in Laid-open Japanese patent publication No. 2002-179895 is intended to increase the heat resistance of a substrate by employing a polyalkylene naphthalate resin and to repress the thermal tarnishing (orange peel like defect) by repressing the reduction of the surface smoothness of a substrate when heated (phenomenon described in (1) above). However, the resin composition disclosed in the patent publication 2002-179895 mentioned above causes problems of thermal tarnishing (whitening) and release mark since calcium montanate (Hostalub CaV102) or pentaerythritol tetraester of montanic acid (Hostalub WE40) is used in the resin composition as wax releasing agent. Whereas a resin composition containing calcium montanate is good in release characteristics, the resin composition causes the thermal tarnishing (whitening) since the calcium montanate exudes or bleeds when a molded article was placed in an environment at a high temperature. When the pentaerythritol tetraester of montanic acid is used, whereas the thermal tarnishing (whitening) is small, release mark or other defects due to poor release characteristics are developed since the tetraester is small in its effect to the release.

As will be understood from the above, a thermoplastic resin composition which satisfies both of the problem of the thermal tarnishing and the problem of release characteristics at the same time has not existed heretofore.

On the other hand, an automotive head lamp in which a reflector and extension are used has a problem that a volatile component is generated from a resin which is exposed to a high temperature at the time of lighting a light source, and the volatile component adheres to a lens portion to cloud the lens surface since the head lamp has a structure in which a device for the light source, reflector, extension, and others are installed in a vessel sealed with a case (housing) in which a lens and parts are housed. Clouding of the lens surface is called fogging, and it is also an important technical subject for a reflector made of a resin and for a material employed for preparing an extension to solve the problem of the fogging. Investigations for repressing the fogging by incorporating an epoxy containing substance in a thermoplastic polyester resin were carried out (see Laid-open Japanese patent publication No. 2001-316573). However, even in the resin composition disclosed in the patent publication 2001-316573, the problem of tarnishing (thermal tarnishing) of a light reflecting metal layer described above still remains.

Further, even if the problems described above were solved in the aspect of the performance of a material, a new fact has become clear that a condition (surface roughness of a mold), which did not present a problem when a light reflecting metal layer is formed after a conventional undercoat treatment was carried out on the surface of a mold, produces another problem depending on the type of a material. It is a problem that the surface roughness (projections and depressions) of a mold is transferred on the surface of a molded article depending on the type of a molding material; and thus if a mold which has the same extent of a surface condition (surface roughness) as that of a conventional mold which was heretofore used when an undercoat treatment is carried out in advance for producing a light reflector was used, the clarity of image becomes poor. More specifically, since the projections and depressions transferred from a mold to a molded article are extremely small, if an undercoat treatment was performed, the projections and depressions are smoothed, and thus no problem was presented heretofore. However, when a light reflecting metal layer was directly formed on the surface of a molded article for a light reflector without applying an undercoat to the surface of a mold in advance, the projections and depressions transferred to the surface of a molded article affect the reflecting characteristics of a light reflector. As the result, only a light reflector having a poor image clarity was obtained heretofore.

A first object of the present invention is to provide a light reflector which has a high heat resistance, and hardly produces a poor appearance (orange peel like defect and whitening) on the surface of a light reflecting metal layer even in an environment at a high temperature, by directly forming a light reflecting metal layer on the surface of a molded article produced from a thermoplastic resin composition, and to provide a thermoplastic resin composition which is excellent in molding characteristics (surface smoothness, release characteristics, and molding shrinkage) and can suitably be used for producing the light reflector.

A second object of the present invention is to provide a light reflector which has a high heat resistance, hardly produces a poor appearance (orange peel like defect and whitening) on the surface of a light reflecting metal layer even in an environment at a high temperature, and displays a sharp reflective appearance, by directly forming a light reflecting metal layer on the surface of a molded article produced from a thermoplastic resin composition, and to provide a molded article which is excellent in molding characteristics (surface smoothness, release characteristics, and molding shrinkage) and can suitably be used for producing the light reflector.

A third object of the present invention is to provide a light reflector which is excellent in the adhesion properties of metal layer/substrate resin, has a high heat resistance, hardly produces a poor appearance (orange peel like defect and whitening) on the surface of a light reflecting metal layer even in an environment at a high temperature, and has a reduced fogging properties, and to provide a thermoplastic resin composition which is excellent in molding characteristics (surface smoothness and particularly metal release characteristics) and can suitably be used for producing a light reflector.

A fourth object of the present invention is to provide a method for producing a light reflector which is excellent in the image clarity and displays a sharp reflective appearance, which method can be used when a light reflector is produced from a thermoplastic resin composition comprising a polyester resin.

SUMMARY OF THE INVENTION

The present invention relates to a thermoplastic resin composition used for producing a light reflector which composition contains 2 to 45 parts by mass of an inorganic filler (B1) treated with a fatty acid type surface treating agent and having an average particle diameter of not more than 3 μm, per 100 parts by mass of a thermoplastic resin (A); to a thermoplastic resin composition used for producing a light reflector which composition contains 2 to 45 parts by mass of an inorganic filler (B2) having a refractive index α of $1.61 \leq \alpha \leq 2.5$ and having an average particle diameter of not more than 3 μm, per 100 parts by mass of a thermoplastic resin (A); to a thermoplastic resin composition used for producing light reflector which composition contains both 0.01 to 3 parts by mass of glycerol triester of a fatty acid and/or a glycerol diester of a fatty acid (C1) and 0.01 to 3 parts by mass of a glycerol monoester of a fatty acid (C2), per 100 parts by mass of a thermoplastic resin composition (A); to a molded article used for producing a light reflector which molded article is produced from one of the resin compositions used for producing a light reflector and described above; and to a light reflector in which a light reflecting metal layer is directly formed on at least a part of the surface of a molded article used for producing a light reflector. (In the present specification and claims, the word "used for producing" are sometimes abbreviated as "for".)

Further, the present invention relates to a method for producing a molded article for a light reflector by molding a thermoplastic resin composition comprising a polyester resin by using a mold having a surface roughness Ra of not more than 0.075 μm on arithmetic mean; to a method for producing a molded article for light reflector by molding a thermoplastic resin composition comprising a polyester resin by using a mold having a surface polished with a polishing agent having a polishing count of 5,000 or more; to a method for producing a molded article for light reflector by molding a thermoplastic resin composition comprising a polyester resin by using a mold having a chrome plated surface; and to a light reflector produced by one of the methods described above, in which reflector a light reflecting metal layer is directly formed on at least a part of the surface of a molded article for a light reflector.

DETAILED DESCRIPTION OF THE PREFERRED EMBODIMENTS

Now, the thermoplastic resin composition for a light reflector of the present invention is described in more detail.

Thermoplastic resin (A) used in the present invention is not specifically limited, and a polyester resin such as a polybutylene terephthalate resin and polyethylene terephthalate resin, and a thermoplastic resin such as a polycarbonate resin, polyarylene sulfide resin, polyphenylene sulfide resin, polyphenylene ether resin, polyimide resin, polysulfone resin, polyethersulfone resin, polyetherketone resin, and polyacetal resin can be mentioned as examples of the thermoplastic resin (A). These thermoplastic resins may be used alone or may be used in a combination of two or more different kind of thermoplastic resins.

Among these thermoplastic resins, a thermoplastic resin (A) comprising, as a main component, a polyester resin (a), that is, a thermoplastic resin (A) in which the content of a polyester resin (a) is 50% by mass or more in the whole thermoplastic resin (A) is preferable from the view point of the fluidity and heat resistance of the resin. Lower limit value of the content of the polyester resin (a) is more preferably 85% by mass or more, and 90% by mass or more is especially preferable. As to the upper limit value of the content of a polyester resin (a), there is not a specific limitation. (Hereinafter, the words "lower limit value" and "upper limit value" are abbreviated as "lower limit" and "upper limit", respectively.)

As the polyester resin (a), a polyester obtained by a polycondensation of an aromatic or alicyclic dicarboxylic acid or its derivative with a polyol can be mentioned. As examples of the dicarboxylic acid, terephthalic acid, isophthalic acid, naphthalene dicarboxylic acid, and cyclohexane dicarboxylic acid can be mentioned. As examples of the polyol, an alkylene diol such as ethylene glycol, diethylene glycol, propane diol, and butane diol, and an addition product of bisphenol A with a polyethylene glycol and/or polypropylene glycol each having 2 to 6 methylene chains can be mentioned.

As specific examples of the polyester resin (a), a polyethylene terephthalate, polybutylene terephthalate, polyethylene naphthalate, and polybutylene naphthalate can be mentioned, and these polyesters may be used alone or may be used as a mixture in which polyesters having different chemical compositions and/or molecular weights are used together.

Especially, from the view point of the moldability, appearance, and cost efficiency, it is preferable to use a polybutylene terephthalate (a-1) and a polyethylene terephthalate (a-2) together. When these terephthalates (a-1) and (a-2) are used together, their mixing ratio is not specifically limited, but it is preferable that the amount of a polybutylene terephthalate (a-1) is 55 to 95% by mass and that of a polyethylene terephthalate (a-2) is 5 to 45% by mass in the whole amount of polyester resin (a). When the mixing ratio of a polybutylene terephthalate is 55% by mass or more, there is a trend that the molding cycle time becomes short and the productivity becomes high, and when it is not more than 95% by mass, the surface smoothness of a molded article tends to become excellent. Besides, when the mixing ratio of a polyethylene terephthalate (a-2) is 5% by mass or more, the surface smoothness of a molded article tends to become excellent, and when it is not more than 45% by mass, there is a trend that the molding cycle time becomes short and the productivity becomes high. Lower limit of the mixing ratio of component (a-1) is more preferably 60% by mass or more. Upper limit of the mixing ratio of component (a-1) is more preferably not more than 90% by mass, and an amount of not more than 85% by mass is especially preferable. Lower limit of the mixing ratio of component (a-2) is more preferably 10% by mass or more, and 15% by mass or more is especially preferable. Upper limit of the mixing ratio of component (a-2) is more preferably not more than 40% by mass.

Type of polybutylene terephthalate (a-1) is not specifically limited, and it may be a homopolymer composed of butylenes terephthalate units only, or it may be a copolymer comprising 70% by mass or more of butylenes terephthalate units in the whole repeating units. As a monomer to be copolymerized, an aromatic or aliphatic polybasic acid such as isophthalic acid, naphthalenedicarboxylic acid, adipic acid, sebacic acid, trimellitic acid, and succinic acid, and their esters can be mentioned, as dibasic acid component other than terephthalic acid and its lower alcohol ester. As glycol component other than 1,4-butanediol, for example, alkylene glycols such as ethylene glycol, diethylene glycol, propylene glycol, trimethylene glycol, hexamethylene glycol, neopentyl glycol, cyclohexane dimethanol, and 1,3-octane diol; aromatic alcohols such as bisphenol A and 4,4'-dihydroxybiphenyl; alcohols in the form of alkylene oxide addition products such as addition product of bisphenol with 2 moles of ethylene oxide and addition product of bisphenol A with 3 moles of propylene oxide; and polyhydroxy compounds such as glycerol and pentaerythritol, and their ester forming derivatives can be mentioned.

Molecular weight of polybutylene terephthalate (a-1) is not specifically limited, but preferably 0.7 to 2.0 in terms of reduced viscosity ($\eta sp/C$), as an index of molecular weight, at 25° C. When the reduced viscosity is 0.7 or higher, the strength of the resin tends to become high, and when it is not more than 2.0, the fluidity of a resin and appearance of a molded article tend to become excellent. Lower limit of the reduced viscosity is preferably 0.8 or higher and 0.9 or higher is especially preferable. Upper limit of the reduced viscosity is preferably not higher than 1.7 and a viscosity of not higher than 1.5 is especially preferable.

Type of polyethylene terephthalate (a-2) is not specifically limited, and it may be a homopolymer composed of ethylene terephthalate units only, and may be a copolymer comprising 70% by mass or more of ethylene terephthalate units in the whole repeating units. As a monomer to be copolymerized, an aromatic or aliphatic polybasic acid such as isophthalic acid, naphthalenedicarboxylic acid, adipic acid, sebacic acid, trimellitic acid, and succinic acid, and their esters can be mentioned, as dibasic acid component other than terephthalic acid and its lower alcohol ester. As glycol component other than ethylene glycol, for example, alkylene glycols such as diethylene glycol, propylene glycol, butylene glycol, trimethylene glycol, hexamethylene glycol, neopentyl glycol, cyclohexane dimethanol, and 1,3-octane diol; aromatic alcohols such as bisphenol A and 4,4'-dihydroxybiphenyl; alcohols in the form of alkylene oxide addition products such as addition product of bisphenol A with 2 moles of ethylene oxide and addition product of bisphenol A with 3 moles of propylene oxide; and polyhydroxy compounds such as glycerol and pentaerythritol, and their ester forming derivatives can be mentioned.

Molecular weight of polyethylene terephthalate (a-2) is not specifically limited, but preferably 0.4 to 1.0 in terms of intrinsic viscosity ($[\eta]$) as an index of molecular weight. When the intrinsic viscosity is 0.4 or higher, the strength of a resin tends to become high, and when it is not higher than 1.0, the fluidity of a resin and appearance of a molded article tend to become excellent. Lower limit of the intrinsic viscosity is preferably 0.45 or higher and 0.5 or higher is especially preferable. Upper limit of the intrinsic viscosity is more preferably not higher than 0.9 and a viscosity of not higher than 0.8 is especially preferable.

In the present invention, the thermoplastic resin (A) preferably comprises a vinyl type thermoplastic resin (x), in addition to the polyester resin (a) described above, from the view points of the shrinkage and surface smoothness of a molded article. Content of the vinyl type thermoplastic resin (x) is not specifically limited, but it is preferably 2 to 20% by mass in the whole amount of the thermoplastic resin (A). When this content is 2% by mass or more, there is a trend that the shrinkage of a molded article decreases and the surface smoothness of a molded article increases, and when it is not more than 20% by mass, the mechanical strength and heat resistance of a molded article tend to increase.

Lower limit of the content of the vinyl type thermoplastic resin (x) is more preferably 3% by mass or more and 4% by mass or more is especially preferable. Upper limit of this content is more preferably not more than 15% by mass, and an amount of not more than 10% by mass is especially preferable.

Type of the vinyl thermoplastic resin (x) is not especially limited, and a known vinyl type thermoplastic resin can be used. As the resin (x), for example, a non-crystalline resin such as an acrylonitrile-styrene copolymer resin (x-1), epoxy group containing acrylonitrile-styrene copolymer resin (x-2), and maleimide type copolymer resin (x-3) can be mentioned. Vinyl type thermoplastic resin (x) is not limited to these copolymer resins, but preferably at least one resin selected from the resins (x-1) to (x-3).

Chemical composition of acrylonitrile-styrene copolymer resin (x-1) is not specifically limited, but the ratio of acrylonitrile to styrene is preferably in the range of 20/80 to 45/55 (acrylonitrile/styrene) in terms of mass ratio, and the range of $25/75$ to 35/65 is more desirable. Method (polymerization method) for producing acrylonitrile-styrene copolymer resin (x-1) is not specifically limited, and a suspension polymerization, emulsion polymerization, solution polymerization, and bulk polymerization can be mentioned. Molecular weight of the acrylonitrile-styrene copolymer resin (x-1) is not specifically limited, but preferably in the range of 50,000 to 200,000 (converted to polystyrene) in terms of weight average molecular weight determined by a gel permeation chromatography.

Chemical composition of epoxy group containing acrylonitrile-styrene copolymer resin (x-2) is not specifically limited, but, for example, a copolymer resin comprising 15 to 40% by mass of vinyl cyanide monomer units, 60 to 84.9% by mass of aromatic vinyl monomer units, and 0.1 to 0.4% by mass of epoxy group containing monomer units is preferable. Method (polymerization method) for producing epoxy group containing acrylonitrile-styrene copolymer resin (x-2) is not specifically limited, and a suspension polymerization, emulsion polymerization, solution polymerization, and bulk polymerization can be mentioned.

Chemical composition of maleimide copolymer resin (x-3) is not specifically limited, but a copolymer resin comprising maleimide type monomer units, and an aromatic vinyltype monomer units and/or another vinyl type monomer units can specifically be mentioned, and a copolymer resin in which the content of a maleimide type monomer unit is 15 to 65% by mass and desirably 20 to 50% by mass can preferably be mentioned. As the maleimide type monomer, N-cyclohexyl maleimide, N-orthochlorophenyl maleimide, N-orthobromomaleimide, and N-phenyl maleimide are preferable, and N-phenyl maleimide is especially desirable. These maleimide type monomers can be used alone or in combination of two or more.

As the aromatic vinyl type monomer, for example, styrene, α-methylstyrene, p-methylstyrene, and t-butylstyrene can be mentioned, and styrene is especially preferable. These aromatic vinyl type monomers can be used alone or in combination of two or more. Content of the aromatic vinyl type monomer is 35 to 85% by mass and preferably in the range of 40 to 70% by mass. As another vinyl type monomer, for example, a vinyl cyanide type monomer, acrylate type monomer, methacrylate type monomer, and unsaturated dicarboxylic acid type monomer can be mentioned, and a vinyl cyanide type monomer is especially preferable.

Next, an inorganic filler (filler particles) used in the present invention is described.

In the present invention, an inorganic filler performs functions as a material for increasing the mechanical strength (reinforcing material), material for imparting the heat resistance, material for reducing the molding shrinkage, and material for forming crystal nuclei for a thermoplastic resin (nucleating agent).

Average particle diameter of the inorganic filler used in the present invention is not more than 3 μm when the filler is used as a reinforcing material, material for imparting the heat resistance, or material for reducing the molding shrinkage among the functions mentioned above. Especially in case of directly forming a light reflecting metal layer on the surface of a molded article, when the average particle diameter is not more than 3 μm, the appearance of the surface of a light reflecting metal layer becomes excellent, but when the average particle diameter exceeds 3 μm, the surface smoothness of a molded article becomes poor and thus a light reflecting metal layer having a satisfiable surface appearance can not be obtained.

When the inorganic filler is used as a reinforcing material, material for imparting the heat resistance, or material for reducing the molding shrinkage, the upper limit of the average particle diameter is preferably not more than 1 μm, more preferably not more than 0.7 μm, and furthermore desirably not more than 0.5 μm, and an diameter of not more than 0.4 μm is especially preferable.

When the inorganic filler is used as a material for forming crystal nuclei, the average particle diameter of the inorganic filler is not specifically limited.

Lower limit of the average particle diameter of the inorganic filler used in the present invention is not specifically limited, but preferably 0.05 μm or more. When the average particle diameter is 0.05 μm or more, the dispersibility of the inorganic filler in a resin tends to become excellent. Lower limit of the average particle diameter is more preferably 0.07 μm or more, and 0.1 μm or more is especially desirable.

Refractive index α of the inorganic filler is not specifically limited, but when the inorganic filler is used as a reinforcing material, material for imparting the heat resistance, or material for reducing the molding shrinkage, the refractive index is preferably in the range of $1.61 \leq \alpha \leq 2.5$. In a case where the refractive index α is in this range, when a light reflector is produced by directly forming a light reflecting metal layer on the surface of a molded article obtained by molding a resin composition containing the filler, the reflection appearance of the light reflector tends to become sharp, and its appearance also becomes excellent. Lower limit of the refractive index α is preferably 1.62 or more, more desirably 1.63 or more, and 1.64 or more is especially preferable. Upper limit of the refractive index α is preferably not more than 2.45 and more desirably not more than 2.43, and a refractive index of not more than 2.40 is especially preferable.

Type of the inorganic filler used in the present invention is not specifically limited, and, for example, zinc sulfide, antimony oxide, zinc oxide, basic lead carbonate, lithopone (zinc sulfide white), basic zinc carbonate, magnesium oxide, barium sulfate, barite powder, calcium carbonate, aluminum silicate, quartz, talc, mica, clay, hydrotalcite, graphite, glass beads, calcium sulfate, magnesium carbonate, magnesium sulfate, calcium silicate, titanium oxide, silicon oxide, calcium titanate, magnesium titanate, barium titanate, white carbon, bentonite, zeolite, dolomite, and seriate can be used.

Among those, as inorganic filler (B2) having a refractive index α in the range described above, for example, zinc sulfide (refractive index=2.37 to 2.43), antimony oxide (refractive index=2.09 to 2.29), zinc oxide (refractive index=2.01 to 2.03), basic lead carbonate (refractive index=1.94 to 2.09), lithopone (refractive index=1.84), basic zinc carbonate (refractive index=1.70), magnesium oxide (refractive index=1.64 to 1.74), barium sulfate (refractive index=1.64 to 1.65), and barite powder (refractive index=1.64 to 1.65) can particularly be mentioned, and these fillers are preferable from the reasons described above.

Among the component (B-2), barium sulfate is preferable from the aspects of the surface smoothness, mechanical strength, and thermal tarnishing (orange peel like defect and whitening) in an environment at a high temperature. Type of the barium sulfate is not specifically limited, but, for example, a precipitated barium sulfate and barite powder can be specifically mentioned as desirable fillers. Between them, a settleable barium sulfate is especially preferable, since when such barium sulfate is used, the surface appearance of a molded article becomes excellent. As specific examples of the settleable barium sulfate, for example, 300R, SS-50, B-30, B-30NC, B-34, B-54, and BF-21F produced by Sakai Chemical Ind. can be mentioned.

Among the inorganic fillers described above, from the aspect of the surface smoothness and mechanical strength, calcium carbonate or aluminum silicate is preferable. Type of calcium carbonate is not particularly limited, and, for example, a heavy calcium carbonate (ground limestone calcium carbonate), settleable calcium carbonate, calcium sulfoaluminate, and organic bentonite can be mentioned. Among them, a settleable calcium carbonate is especially preferable since when the settleable calcium carbonate is used, the surface appearance of a molded article becomes excellent. As specific examples of the settleable calcium carbonate, for example, Vigot-10, vigot-10S, and Vigot-15 produced by SHIRAISHI KOGYO KAISHA, LTD. (Shiraishi Industrial Co., Ltd.) and CALSEEDS P produced by Kamishima Chemical Industry Co., Ltd. can be mentioned. Type of the aluminum silicate is not specifically limited, and, for example, a hydrokaolin, calcined kaolin, and clay can be mentioned. As specific examples of the hydrokaolin, for example, ASP101, ASP102, and ASP170 produced by ENGELHARD CORPORATION, and as specific examples of the calcined kaolin, SATINTONE 5 and ULTREX 98 produced by ENGELHARD CORPORATION can be mentioned. Among them, a hydrokaolin is especially preferable since when the hydrokaolin is used, the surface appearance of a molded article becomes excellent.

Further, as to whether a surface treatment should be performed to the inorganic filler used in the present invention is not specifically limited, but when the inorganic filler is used as a reinforcing material, material for imparting the heat resistance, or material for reducing the molding shrinkage of a molded article, it is preferable to perform the surface treatment. In this connection, when the inorganic filler is subjected to a surface treatment, it is preferable to treat the filler with an fatty acid type surface treating agent. In the present specification and claims, the term "fatty acid type surface treating agent" means at least one compound selected from fatty acids, esters of fatty acids, and salts of fatty acids.

Type of the fatty acid is not specifically limited, but a fatty acid having 12 to 22 carbon atoms can be mentioned as examples. Specifically, rosin acid, lauric acid, myristic acid, stearic acid, oleic acid, palmitic acid, and behenic acid can be mentioned. Among them, stearic acid and behenic acid are especially preferable.

Type of the esters of fatty acids is not specifically limited, and, for example, esters of glycerol with a fatty acid having 12 to 22 carbon atoms can be mentioned. Specifically, a monoglyceride of a fatty acid, a diglyceride of a fatty acid, and triglyceride of a fatty acid can be mentioned. Among them, a diglyceride of a fatty acid is especially preferable.

Type of the salts of fatty acids is not specifically limited, and for example, calcium or zinc salt of a fatty acid having 12 to 22 carbon atoms can be mentioned. Specifically, calcium stearate and zinc stearate can be mentioned. Between them, calcium stearate is especially preferable.

These fatty acid type surface treating agents may be used alone or in combination of two or more.

The fatty acid type compounds such as the fatty acids, esters of fatty acids, and salts of fatty acids mentioned above perform a function as release agent in addition to the function of surface treating agent. Accordingly, when an inorganic filler treated with a fatty acid type surface treating agent is used, not only the dispersibility of the inorganic filler is improved and the surface smoothness of a molded article become excellent, but also the release characteristics of a molded article becomes excellent and release marks are not caused on the surface of a molded article, and thus an excellent light reflecting metal layer is obtained when the light reflecting metal layer is directly formed on the surface of a molded article.

That is, from the aspect of release characteristics, it is preferable to use an inorganic filler (B1) treated with a fatty acid type surface treating agent.

Amount of the fatty acid type surface treating agent to be adhered is not specifically limited, but an amount in the range of 0.1 to 3% by mass based on the sum of the amount of the inorganic filler and that of the fatty acid type surface treating agent is preferable. When the amount of the inorganic filler adhered is 0.1% by mass or more, there is a trend that the effect of the surface treatment is sufficiently produced and thus the dispersibility of the inorganic filler in a resin composition becomes excellent and the surface smoothness of a molded article increases. Besides, when the amount of the filler adhered is not more than 3% by mass, the fogging tends to come to be hardly produced when a molded article on the surface of which a light reflecting metal layer is directly formed was heated. Lower limit of this adhesion amount is more preferably 0.3% by mass or more, and 0.5% by mass or more is especially preferable. Further, the upper limit of the amount is more preferably not more than 2.7% by mass, and an amount of not more than 2.5% by mass is especially preferable.

A method for treating the inorganic filler with a surface treating agent is not specifically limited, and the inorganic filler can be treated by a known method. For instance, the surface treatment can be performed by placing the inorganic filler and surface treating agent in such a mixer as a Henschel mixer and then mixing them. In case of calcium carbonate, a surface treating method can be used in which a surface treating agent is added into a reactant emulsion used in a step for obtaining a settleable calcium carbonate by a reaction of continuously carbonating calcium by spraying the reactant emulsion in a carbonic acid gas stream.

Content of the inorganic filler in a resin composition of the present invention is not specifically limited, but preferably in the range of 2 to 45 parts by mass per 100 parts by mass of the thermoplastic resin (A) when the inorganic filler is used as a reinforcing agent, material for imparting the heat resistance, or material for reducing the molding shrinkage. When this content is 2 parts by mass or more, there is a trend that the mechanical strength increases, heat resistance becomes excellent, and molding shrinkage reduces. Besides, when this content is not more than 45 parts by mass, there is a trend that the dispersibility of the inorganic filler becomes excellent, and thus the surface smoothness of a molded article becomes excellent. Lower limit of the content of the inorganic filler is preferably 3 parts by mass or more, and 4 parts by mass or more is especially preferable. Upper limit of the content of the inorganic filler is preferably not more than 30 parts by mass and an amount of not more than 15 parts by mass is especially preferable.

When the molding shrinkage of a molded article is in the range of 1.2 to 1.6%, release characteristics and low warpage properties preferably become excellent. Lower limit of the molding shrinkage is more preferably 1.25% or more. Upper limit of the molding shrinkage is more preferably not more than 1.55% and furthermore preferably not more than 1.5%, and a shrinkage of not more than 1.45% is especially preferable.

In this connection, when the inorganic filler is used as a material for forming crystal nuclei, the content of the inorganic filler is not specifically limited.

Next, the glycerol triester of a fatty acid and/or a glycerol diester of a fatty acid (C1) is described.

In the present invention, component (C1) performs a function as a release agent. This component (C1) is to make a molded article develop excellent release characteristics by forming an external lubricating film on the surface of a molded article at the time of molding. Also, this component (C1) makes the tarnishing of a light reflecting metal layer (thermal tarnishing) extremely small, even when a light reflector in which a light reflecting metal layer is directly formed on the surface of a molded article is held in an environment at a high temperature.

There are 3 kind of compounds (monoester, diester, and triester) in the esters obtained from glycerol and a fatty acid, and the component (C1) is at least one compound selected from the triester and diester. Whereas both the triester and the diester develop a release effect, the monoester is small in the release effect. Between the triester and diester, triester is especially preferable from the aspect of release characteristics.

Type of a fatty acid which is used to form the ester component (C1) is not specifically limited, and higher fatty acids such as those having carbon atoms in the range of 18 (stearic acid) to 32 (lacceric acid) can be mentioned as examples of the fatty acid. Among them, acids having carbon atoms in the range of 22 (behenic acid) to 32 (lacceric acid) are preferable and the acids having carbon atoms in the range of 29 (montanic acid) to 32 (lacceric acid) are especially preferable.

Alcohol which is used to form the ester component (C1) is glycerol. In the present invention, based on the fact that the esters have a glycerol skeleton, a molded article has an excellent release characteristics and the thermal tarnishing becomes considerably small. When the alcohol is a diol such as ethylene glycol, a molded article has some extent of release characteristics but the thermal tarnishing is caused. When the alcohol is a tetraol such as pentaerythritol, the thermal tarnishing is small but a molded article hardly develop sufficient release characteristics, and thus the objects of the present invention can not be achieved.

Content of the component (C1) is 0.01 to 3 parts by mass per 100 parts by mass of the thermoplastic resin (A). When the content of the component (C1) is 0.01 parts by mass or more, the release characteristics tend to become excellent, and when it is not more than 3 parts by mass, the thermal tarnishing tend to reduce. Lower limit of the content is preferably 0.03 parts by mass or more and 0.05 parts by mass or more is especially preferable. Upper limit of the content is preferably not more than 2.5 parts by mass and an amount of not more than 2 parts by mass is especially preferable.

As described above, while the component (C1) is a component which is used as a release agent and which does not cause the thermal tarnishing, but a release agent other than the component (C1) may be contained in a thermoplastic resin composition for a light reflector of the present invention in the range in which the thermal tarnishing does not become worse.

Next, glycerol monoester of a fatty acid (C2) is described.

Glycerol monoester of a fatty acid (C2) functions as an internal lubricating agent and has an effect of improving the fogging properties. The reason for these facts are that since the component (C2) increase the internal lubricity of a resin composition to be molded, decomposition of a resin in a melted and kneaded state is repressed at the time of compounding or molding, and thus the amount of volatile components (low molecular weight decomposition products) formed at the time when a molded article was overheated (at the time of ageing) is reduced.

In the present invention, it is preferable to use the components (C1) and (C2) together. When the components (C1) and (C2) are used together, the release characteristics tend to be increased and the fogging properties tend to be improved (fogging is reduced) at the same time. This is because the component (C1) has a large effect on the release characteristics but is small in the effect on the internal lubricity, whereas the component (C2) has a large effect on the internal lubricity but is small in the effect on the release characteristics. Accordingly, it becomes possible to improve both the release characteristics and fogging properties while maintaining an excellent appearance of a molded article when the components (C1) and (C2) are used together. In this connection, with respect to a material for lamp parts such as an extension, it is important that a good balance is maintained among the appearance, release characteristics, and fogging properties. Especially, in a case where a molded article such as a head lamp and extension having a large size and complicated shape is molded, such procedure described just above is preferable since the effect of the component (C2) (effect as an internal lubricating agent by which the fluidity of a resin at the time of molding is improved) is sufficiently produced.

Type of the fatty acid which is used to form the ester component (C2) is not specifically limited, and for example, higher fatty acids such as those having carbon atoms in the range of 12 (lauric acid) to 28 (montanic acid) can be mentioned. Among them, fatty acids having carbon atoms in the range of 16 (palmitic acid) to 22 (behenic acid) are preferable, and fatty acids having carbon atoms in the range of 18 (stearic acid) to 20 (archaic acid) are especially preferable. The fatty acid may be an unsaturated acid, and, for example, glycerol monoester of oleic acid having 18 carbon atoms can be used.

Content of the component (C2) is not specifically limited, but preferably 0.01 to 3 parts by mass per 100 parts by mass of the thermoplastic resin (A). When the content of (C2) is 0.01 parts by mass or more, the lubricity (molding fluidity) tends to be increased, and when it is not more than 3 parts by mass, the appearance of a molded article tends to become excellent. Lower limit of this content is preferably 0.03 parts by mass or more, and 0.05 parts by mass or more is especially preferable. Further, the upper limit of this content is preferably not more than 2.5 parts by mass and an amount of not more than 2 parts by mass is especially preferable.

In addition, it is possible to blend a known substance, which is generally blended to a thermoplastic resin, to the thermoplastic resin composition for a light reflector of the present invention to impart desired characteristics depending on the purposes. For example, a coloring agent such as a dyestuff and pigment, antioxidant for improving thermal stability, UV absorber, light stabilizer, plasticizer such as an alkyl ester of pyllomeritic acid or epoxidized soybean oil for improving the fluidity, fire retardant, and antistatic agent can be mentioned as examples of the additive.

Since the thermoplastic resin composition for a light reflector of the present invention has such excellent characteristics as described above, even when it was intended to impart a desired luster and designability to a molded article by blending the so-called metallic pigment with a resin composition, without subjecting a molded article to a metallizing (metal vapor deposition) treatment, preferable characteristics can be obtained. Likewise, since the thermoplastic resin composition of the present invention has the excellent characteristics as described above, even when a paint is applied on the portion where a metallizing treatment was conducted on the surface of a molded article or even when a paint is applied directly on the surface of a molded article without subjecting a molded article to a metallizing treatment to impart a designability to the molded article by coloring impartment of a metallic luster, preferable characteristics can be obtained.

Next, the method for producing the thermoplastic resin composition for a light reflector of the present invention is described.

Method for producing the thermoplastic resin composition for a light reflector of the present invention is not specifically limited, and, for instance, the resin composition can be produced by a melt kneading method. Equipment for the melt kneading is not specifically limited, and a known equipment can be used. For example, an extruder, Banbury mixer, roller, and kneader can be used.

Next, the method for molding the thermoplastic resin composition for a light reflector of the present invention is described.

Method for molding the thermoplastic resin composition for a light reflector is not specifically limited, and a known molding method such as an injection molding, gas assist molding, cooling and heating cycle molding, blow molding, and extrusion molding method can be used. That is, a molded article can be obtained by one of these methods. Among them, an injection molding method is preferable from the aspect of general-purpose properties. Further, when the surface of a mold was polished in advance with a polishing agent having a polishing count of 5,000 or more, or the surface of a mold is subjected to a surface treatment such as a chrome plating in advance, the surface smoothness and luster of a molded article are increased, and thus it becomes easy to obtain an excellent appearance after a metallizing treatment or painting was conducted.

Next, the molded article for a light reflector of the present invention is described.

Light reflectance from the surface of a molded article for a light reflector of the present invention is not particularly limited, but it is preferable that the reflectance is at all times 65% or more at a wave length of light in the range of from 420 to 700 nm.

In a case where the reflectance is 65% or more at a wave length in the range of 420 to 700 nm, when a light reflecting metal layer was directly formed on the surface of a molded article, a sharp reflective appearance can be obtained and thus the reflective appearance of a final product preferably becomes excellent.

In this connection, the term "reflectance" used in the present specification and claims means a value of optical reflection from the surface of a molded article determined by connecting a Macbeth COLOR EYE CE-3000 spectrophotometer to a CCM SYSTEM COLOR SCOPE produced by Sumika Color Co., Ltd. and measuring the reflected light by using a D light source, within a visual field of 10°, and at a wave length in the range of 400 nm to 700 nm.

Lower limit of the reflectance is preferably 66% or more and more preferably 68% or more, and 70% or more is especially preferable. Upper limit of the reflectance is not specifically limited.

Molded article for a light reflector having such reflectance can be obtained by molding a thermoplastic resin composition used for a light reflector and comprising 2 to 45 parts by mass of an inorganic filler (B2) having a refractive index α of $1.61 \leq \alpha \leq 2.5$ and an average particle diameter of not more than 3 μm.

Besides, the linear shrinkage of a molded article for light reflector of the present invention is not specifically limited, but preferably not more than 1.6%. When the linear shrinkage is not more than 1.6%, there are trend that the release characteristics and warpage properties are preferably become excellent (release characteristics are increased and warpage is decreased). Thus, such case is preferable. Lower limit of the linear shrinkage is not specifically limited, but preferably 0.6% or more and more desirably 0.8% or more. Its upper limit is preferably not more than 1.55% and more preferably not more than 1.50%, and a value of not more than 1.45% is especially preferable.

In this connection, the term "linear shrinkage" used in the present specification and claims means a value obtained by, first, determining the size L of a molded article after the molded article obtained was cooled down to a room temperature, and then calculating from the size L described above and the size $L_0$ of a mold at a room temperature and by using the following equation:

Linear shrinkage of molded article (%)=$\{(L_0-L)/L_0\} \times 100(\%)$

Image clarity of a molded article for a light reflector of the present invention is not specifically limited, but preferably 90% or more. When the image clarity of a molded article for a light reflector is 90% or more, the image clarity of a light reflector in which a light reflecting metal layer is directly formed at least a part of the surface of a molded article tends to become excellent.

Now, the term "image clarity of a molded article for a light reflector" used in the present specification means a value obtained by the determination using an image clarity test instrument ICM-1DP produced by SUGA TEST INSTRUMENTS CO., LTD. at an optical comb width of 0.5 mm according to JIS H 8686.

Image clarity of a molded article for a light reflector is more preferably 93% or more and furthermore desirably 95% or more, and 97% or more is most desirable.

Molded article having such image clarity can be obtained by molding a thermoplastic resin composition of the present invention by using a specific mold described below.

Next, a method for producing a molded article for a light reflector is described.

Method for producing a molded article for a light reflector is not specifically limited, and a known method such as an injection molding, gas assist molding, cooling and heating cycle molding, blow molding, and extrusion molding method can be used. That is, a molded article for a light reflector can be obtained by one of these methods. Among them, an injection molding method is preferable from the aspect of general-purpose properties.

In the present invention, when a thermoplastic resin composition comprising a polyester resin is used as thermoplastic resin composition, it is preferable to produce a molded article for a light reflector by using a mold having a surface roughness Ra of not more than 0.075 μm on arithmetic mean. In this connection, the surface roughness Ra on arithmetic mean is a standard defined in JIS B0601 and obtained by measuring the surface of a mold by using a non-contact three-dimensional measuring apparatus NH-3 produced by Mitaka Optical Instrument Co., Ltd. at an evaluation length of 2 mm, cut-off value of 0.8 mm, and evaluation rate of 0.3 mm/sec.

When a molded article for a light reflector, particularly a molded article for a light reflector on the surface of which molded article a light reflecting metal layer is directly formed is produced by using a thermoplastic resin composition, the combination of a type of a thermoplastic resin composition with a mold for molding the resin composition is especially important.

When a thermoplastic resin composition comprising a polyester resin is molded, particularly the surface condition (surface roughness) of a mold affects the surface condition of a molded article to be obtained for a light reflector. This is attributable to the flow characteristics of a polyester resin. That is, since a polyester resin is excellent in fluidity, it flows even into minute spaces between projections and depressions on the surface of a mold, and as the result, the surface condition of a mold tends to be transferred as it is on the surface of a molded article.

This transfer tends to occur when the content of a polyester resin in a thermoplastic resin which constitutes a thermoplastic resin composition is 10% by mass or more, and the transfer becomes more remarkable at the content of 30% by mass or more, furthermore remarkable at the content of 50% or more, and especially remarkable at the content of 80% by mass or more, and it becomes most remarkable when the content of a polyester resin is 100% by mass.

Accordingly, it is desirable to suitably select an arithmetic mean surface roughness Ra of a mold in conformance to the content of a polyester resin. For instance, when the content of a polyester resin is 10% by mass or more, the arithmetic mean surface roughness Ra of a mold is preferably not more than 0.07 μm; when the content is 30% by mass or more, the Ra is preferably not more than 0.065 μm; when the content is 50% by mass or more, the Ra is preferably not more than 0.06 μm; when the content is 80% by mass or more, the Ra is preferably not more than 0.055 μm; and when the content is 100% by mass, the Ra is preferably not more than 0.05 μm.

Method for making the surface of a mold to a roughness in the range of the arithmetic mean surface roughness Ra described above is not specifically limited, and a method in which the surface of a mold is polished with a ultrasonic polishing machine or by hand method by using a diamond file, grinding stone, ceramic grinding stone, ruby grinding stone, GC grinding stone, or others to adjust the surface roughness to a desired arithmetic mean surface roughness Ra can be used. For instance, in order to make the arithmetic mean surface roughness Ra of a mold not more than 0.07 μm, it is preferable to polish the surface of a mold with a polishing agent having a polishing count of 4,000 or more; to make the arithmetic mean surface roughness Ra of a mold not more than 0.06 μm, it is preferable to polish the surface of a mold with a polishing agent having a polishing count of 5,000 or more; to make the arithmetic mean surface roughness Ra of a mold not more than 0.05 μm, it is preferable to polish the surface of a mold with a polishing agent having a polishing count of 6,000 or more; to make the arithmetic mean surface roughness Ra of a mold not more than 0.04 μm, it is preferable to polish the surface of a mold with a polishing agent having a polishing count of 8,000 or more; and to make the arithmetic mean surface roughness Ra of a mold not more than 0.03 μm, it is preferable to polish the surface of a mold with a polishing agent having a polishing count of 14,000 or more.

In the present invention, when a thermoplastic resin composition comprising a polyester resin is used as thermoplastic resin, a chrome-plated mold may be used instead of a mold polished by such a method as described above. Also, a chrome plating may further be applied on the surface polished by such a method as described above. As a matter of course, a mold polished by the method described above may be used as it is without causing any problems.

And, by producing a molded article for a light reflector of the present invention by such a method as described above, it tends to become possible to make the image clarity of a molded article for a light reflector as excellent as 900 or more, as described above.

Next, the light reflector of the present invention is described.

Light reflector of the present invention is one in which a light reflecting metal layer is directly formed on at least a part of the surface of a molded article for a light reflector described above.

Diffused reflectance (degree of diffused reflection) of a light reflector is not specifically limited, but it is preferable that the diffused reflectance at an initial state or after a heat resistance test is preferably not more than 3%. In this case, a light reflector tends to perform an excellent function. In this connection, the term "diffused reflectance" of a light reflector used in the present specification is a value determined by using a reflectance transmittance meter HR-100 produced by Murakami Color Technology Research Laboratory.

Image clarity of a light reflector is not specifically limited, but 90% or more is preferable, 93% or more is more preferable, 95% or more is furthermore preferable, 96% or more is especially preferable, and 97% or more is most preferable.

Method for directly forming a light reflecting metal layer on the surface of a molded article is not specifically limited, and the metal layer can be formed by a known method such as a vapor deposition method. For example, the following method can be mentioned:

(1) First, a molded article is placed in an evacuated vapor depositing apparatus, an inert gas such as argon, and oxygen gas are introduced in the apparatus, and then the surface of the molded article is subjected to a plasma activating treatment.

(2) Next, sputter particles (such as alumina particles) sputtered by plasma are adhered to the surface of a molded article in a vapor depositing apparatus, which plasma is generated by induced discharge in a chamber by passing a current through an electrode which carries a target.

(3) Further, a silicon containing gas for forming a protective coat for a vapor deposited film of a metal such as aluminum is introduced in the chamber and subjected to a plasma polymerization treatment or silicon oxide is adhered on the surface of the vapor deposited metal (aluminum) film by an ion plating method.

EXAMPLES

Next, the present invention is described in more detail with reference to Examples and Comparative Examples. However, it should be understood that the scope of the present invention is by no means restricted by such specific Examples and Comparative Examples. In the Examples and Comparative Examples below, the following methods were used for evaluating various characteristics.

[Method for Evaluating Surface Roughness of Mold]

Roughness of the surface of a mold was measured by using a non-contact three-dimensional measuring apparatus NH-3 produced by Mitaka Optical Instrument Co., Ltd. at an evaluation length of 2 mm, cut-off value of 0.8 mm, and evaluation rate of 0.3 mm/sec, and then the arithmetic mean surface roughness Ra was obtained according to JIS B0601.

[Method for Evaluating Resin]
(1) Reduced Viscosity (ηsp/C)

Mixed solvent of phenol and tetrachloroethane in the ratio of 1:1 (mass ratio) (produced by Kanto Chemical Co., Inc.; trade name: PTM11) in an amount of 50 ml was added to 0.25 g of a polybutylene terephthalate resin and then heated at 140° C. for 10 to 30 min to dissolve thereby to obtain a solution. Temperature of the solution was adjusted for 3 min in a constant temperature water bath kept at 25° C. and then the time in which the solution passed through the distance between marked lines of a Ubbellohde viscometer was determined to obtain a reduced viscosity ηsp/C according to the following equation:

$$\eta sp/C = (\eta rel-1)/C = (T/T_0-1)/C$$

T: Time in which a sample solution passed through the distance between marked lines of a capillary tube (second)

$T_0$: Time in which only the mixed solvent passed through the distance between marked lines of a capillary tube (second)

C: Concentration of sample (g/dl)

(2) Intrinsic Viscosity ([η])

Polyethylene terephthalate resin solutions having a concentration of 0.2, 0.3, and 0.4 g/dl, respectively, were prepared by using a mixed solvent of phenol and tetrachloroethane in the ratio of 1:1 (mass ratio). Viscosity of every solution was determined by using a Ubbellohde automatic viscometer (AVL-2C produced by SAN DENSHI Co., Ltd.) at 25° C., and the values obtained were extrapolated down to 0 g/dl by Huggins plot to obtain an intrinsic viscosity [η].

(3) Acid Value

Polybutylene terephthalate was dissolved in benzyl alcohol and then the solution was titrated with 1/50 N NaOH benzyl alcohol solution to obtain the acid value.

[Method for Evaluating Molded Article]
(1) Release Characteristics: Evaluation Method 1

Appearance of a molded article was observed by viewing and whether release marks were produced was examined to evaluate the release characteristics according to the following criteria:

◯: Release characteristics were excellent and no defects were noticed on the surface of a molded article.

X: Release characteristics were poor and thus the development of release marks was noticed on the surface of a molded article.

(2) Release Characteristics: Evaluation Method 2

Resin compositions having each chemical composition and prepared by a melt kneading method were palletized, dried, and then subjected to an injection molding by using an injection molding machine (SANJECT3601 60T produced by SANJO PRECISION CO., LTD.) under conditions of a cylinder temperature of 260° C., mold temperature of 80° C., cooling time of 20 seconds, and a cycle of 35 seconds to form cylindrical molded articles having a length of 50 mm, inside diameter of 45 mm, and thickness of 3 to 4 mm, and the ejection force at the time of releasing (release force) was determined by a censor, respectively. The smaller the release force is, the more the release characteristics are excellent.

In this connection, a molded article having a release force of lower than 500N has excellent release characteristics when a resin composition is molded into parts of various type of lamps. In a case where the release force exceeds 500N, a resin composition has a difficulty in release characteristics, and thus sometimes, the productivity is reduced and problems are caused when a large-sized molded article or a molded article having a complicated-shape is produced.

(3) Molding Shrinkage

Size L of a molded article was determined after it was cooled down to a room temperature, and the size $L_0$ of the mold at a room temperature was also determined. Molding shrinkage (linear shrinkage) was obtained from the size L and size $L_0$ according to the following equation:

$$\text{Molding shrinkage }(\%) = \{(L_0-L)/L_0\} \times 100(\%)$$

(4) Fogging Properties

Small pieces each having a size of about 20 mm×about 10 mm were cut out from a molded article, 6 g of the cut out pieces were placed in a test tube (30 mmϕ×200 mm length), and then set in a fogging test equipment (fogging tester WSF-2 improved type produced by SUGA TEST INSTRUMENTS CO., LTD.). Further, a lid of a heat-resistant glass (TEMPAx glass, 55 mm length×55 mm width×3 mm thickness) was put on the test tube described above, an aluminum block through which a cooling water adjusted to a temperature of 25° C. was being flowed was further put thereon, and then a heating treatment was conducted at 160° C. for 20 hours. As a result of this heating treatment, deposits of decomposition products sublimed from a resin composition were separated out on the inside wall of the glass plate. Haze (light transmittance) of the glass plate was determined by using a reflectance•transmittance meter HR-100 produced by Murakami Color Technology Research Laboratory.

In this connection, in a case where a haze of a glass plate after heated at 160° C. for 20 hours exceeds 45%, a molded article has problems when it is practically used as various type of lamp parts. When the haze of a glass plate is 45% or lower, a molded article preferably performs excellent functions as various type of lamp parts, and a case where the haze is 20% or lower is especially preferable.

(5) Reflectance from Surface of Molded Article

The reflectance was obtained by determining the optical reflection from the surface of a molded article by connecting a Macbeth COLOR EYE CE-3000 spectrophotometer to a CCM SYSTEM COLOR SCOPE produced by Sumika Color Co., Ltd. and using a D light source, within a visual field of 10° and a wave length in the range of 400 nm to 700 nm.

(6) Image Clarity

Image clarity was determined by using an image clarity test instrument ICM-1DP produced by SUGA TEST INSTRUMENTS CO., LTD. at an optical comb width of 0.5 mm according to JIS H 8686.

[Method for Evaluating Light Reflector]
(1) Evaluation of Appearance by Visual Observation Appearance (defects by release marks, orange peel like defects, whitening, and reflection appearance) of a light reflecting metal layer of a light reflector was evaluated by visual observation according to the following criteria, before and after a heat resistance test.

1) Release mark

⊚: White pattern caused by the transfer of projections and depressions existing on the surface of a mold (transfer of mold projections and depressions) due to poor release characteristics of a resin or white pattern of fluff or fuzz like projections and depressions (flow mark like projections and depression) due to the shrinkage of a resin was not noticed at all.

◯: White pattern due to the transfer of mold projections and depressions, or a flow mark like white pattern was slightly noticed depending on a viewing angle, but the pattern was at a level of posing no problem in a practical use.

Δ: White pattern due to the transfer of mold projections and depressions, or a flow mark like white pattern was noticed on the surface.

X: White mark due to the transfer of mold projections and depressions and a flow mark like white pattern were excessively noticed.

2) Orange peel like defect

⊚: Surface roughness (rough or sandy, or grainy feeling) did not exist at all.

○: Surface roughness (rough or sandy, or grainy feeling) was slightly noticed depending on a viewing angle, but it was at a level of posing no problem in a practical use.

Δ: Surface roughness (rough or sandy, or grainy feeling) existed.

X: Surface roughness (rough or sandy, or grainy feeling) was excessively noticed.

3) Whitening (before heat resistance test)

⊚: Whitening of an uneven shape (for example, spot like shape) due to the exudation or bleeding of an additive to the surface of a molded article at the time of molding did not exist at all.

○: Whitening of an uneven shape (for example, spot like shape) due to the exudation or bleeding of an additive to the surface of a molded article at the time of molding was slightly noticed depending on a viewing angle, but it was at a level of posing no problem in a practical use.

Δ: Whitening of an uneven shape (for example, spot like shape) due to the exudation or bleeding of an additive to the surface of a molded article at the time of molding was noticed.

X: Whitening of an uneven shape (for example, spot like shape) due to the exudation or bleeding of an additive to the surface of a molded article at the time of molding was excessively noticed.

4) Whitening (after heat resistance test)

⊚: Whitening of an uneven shape (for example, spot like shape) due to the bleeding of an additive to the surface of a molded article at the time of molding or whitening of an uneven shape (for example, spot like shape) due to the exudation or bleeding of an additive to the surface of a molded article at the time of heat resistance test did not exist at all.

○: Whitening of an uneven shape (for example, spot like shape) due to the exudation or bleeding of an additive to the surface of a molded article at the time of molding or whitening of an uneven shape (for example, spot like shape) due to the exudation or bleeding of an additive to the surface of a molded article at the time of heat resistance test was slightly noticed depending on a viewing angle, but it was at a level of posing no problem in a practical use.

Δ: Whitening of an uneven shape (for example, spot like shape) due to the exudation or bleeding of an additive to the surface of a molded article at the time of molding or whitening of an uneven shape (for example, spot like shape) due to the exudation or bleeding of an additive to the surface of a molded article at the time of heat resistance test was noticed.

X: Whitening of an uneven shape (for example, spot like shape) due to the exudation or bleeding of an additive to the surface of a molded article at the time of molding or whitening of an uneven shape (for example, spot like shape) due to the exudation or bleeding of an additive to the surface of a molded article at the time of heat resistance test was excessively noticed.

5) Reflection appearance

○): Reflection appearance was sharp.

X: Reflection appearance was dull.

(2) Diffused Reflectance

Diffused reflectance of a light reflector both before and after heat resistance test were determined by using a reflectance•transmittance meter HR-100 produced by Murakami Color Technology Research Laboratory.

(3) Adhesion Strength of Metal Layer

Adhesion strength of a metal layer both at an initial state and after heat resistance test were evaluated according to the so-called checkers peeling test (lattice pattern cutting test). In the Examples and Comparative Examples below, the tests were performed by employing specifically a cellophane tape produced by Nichiban Co., Ltd. (adhesive plaster manufacturing company) (product number: CT-24) and making cuts into the metal layer in both lengthwise direction and breadthwise direction at 1 mm distance so that 100 checkers were formed. Result of the evaluation was shown by percentage (%) of checkers remaining on the surface of a molded article after the peeling test to the total number of checkers before the peeling test. Metal layer which showed 100% remaining ratio at an initial state and 80% or more after heat resistant test preferably performed a function as light reflector.

In this connection, the checkers peeling test for the metal layer at an initial state was performed after aluminum vapor deposition was conducted on the surface of a molded article for a light reflector and then allowed to stand at a room temperature for more than 24 hours. Also, the checkers peeling test for the metal layer after a heat resistance test was performed after a light reflector was subjected to a heat resistance test and then allowed to stand at a room temperature for more than 24 hours.

(4) Image Clarity

Image clarity of a light reflector was determined by using an image clarity test instrument ICM-1DP produced by SUGA TEST INSTRUMENTS CO., LTD. at an optical comb width of 0.5 mm according to JIS H 8686.

(5) Heat Resistance Test

Heat resistance test was performed by allowing a light reflector to stand in a hot air at 160° C. for 24 hours to heat by using a GEAR OVEN GPH(H)-100 produced by Tabai Espec Corp.

[Production Examples of Vinyl Type Thermoplastic Resins]

Production Example 1

Acrylonitrile-Styrene Copolymer Resin (x-1)

Distilled water in an amount of 115 parts by mass, 1 part by mass of calcium tertiary phosphate, and 0.001 parts by mass of DEMOL P (produced by Kao Corp.) were placed in a reaction vessel and stirred. A mixture of 25 parts by mass of acrylonitrile, 75 parts by mass of styrene, 0.5 parts by mass of t-dodecylmercaptan, 0.17 parts by mass of azobisisobutyronitrile, and 0.003 parts by mass of GAFAC GB-520 (produced by Toho Chemical Industry Co., Ltd.) was added to the reaction vessel to make them a state of suspension, heated up to 75° C., and maintained at the same temperature for 240 minutes to complete the polymerization thereby to obtain acrylonitrile-styrene copolymer resin (x-1). The resin (x-1) thus obtained had a chemical composition of acrylonitrile/styrene=34/66 (mass ratio).

Production Example 2

Epoxy Group Containing Acrylonitrile-Styrene Copolymer Resin (x-2)

Distilled water in an amount of 115 parts by mass, 1 part by mass of calcium tertiary phosphate, and 0.001 parts by mass of DEMOL P (produced by Kao Corp.) were placed in a reaction vessel and stirred. A mixture of 23 parts by mass of acrylonitrile, 76.7 parts by mass of styrene, 0.3 parts by mass of glycidyl methacrylate, 0.5 parts by mass of t-dodecylmercaptan, 0.17 parts by mass of azobisisobutyronitrile, and 0.003 parts by mass of GAFAC GB-520 (produced by Toho Chemical Industry Co., Ltd.) were added to the reaction vessel to make them a state of suspension, heated up to 75° C., and maintained at the same temperature for 240 minutes to complete the polymerization thereby to obtain epoxy group containing acrylonitrile-styrene copolymer resin (x-2). The resin (x-2) thus obtained had a chemical composition of acrylonitrile/styrene/glycidyl methacrylate=24.9/74.7/0.4 (mass ratio).

Production Example 3

Maleimide Type Resin (x-3)

N-phenylmaleimide in an amount of 20 parts by mass, 40 parts by mass of styrene, 20 parts by mass of acrylonitrile, 20 parts by mass of methyl ethyl ketone, 0.01 parts by mass of 1,1-azobis(cyclohexane-1-carbonitrile), and 0.05 parts by mass of t-dodecylmercaptan were continuously supplied to a 20 L polymerization reactor which was equipped with a stirring device and atmosphere in which was substituted by nitrogen gas. While maintaining the temperature within the polymerization reactor constantly at 110° C., the liquid polymerization reaction product was continuously taken out with a gear pump provided at the bottom of the polymerization reactor so that the average residence time became 2 hours, the liquid polymerization reaction product was successively allowed to reside in a heat exchanger maintained at 150° C. for about 20 minutes, and then introduced into a two-vent type twin-screw extruder of 30 mmϕ, barrel temperature of which extruder was controlled at 230° C. Volatile components in the product were removed by maintaining the first vent portion of the extruder under an atmospheric pressure and maintaining the second vent portion under a reduced pressure of 2.7 kPa, and the polymerization reaction product was pelletized with a pelletizer to obtain maleimide type copolymer resin (x-3). The resin (x-3) thus obtained had a chemical composition of N-phenylmaleimide/styrene/acrylonitrile=27/56/17 (mass ratio).

Example 1

As the thermoplastic resin (A), 76.2 parts by mass of polybutylene terephthalate resin (a-1) (produced by Mitsubishi Rayon Co., Ltd., trade name: TUFPET N1100, reduced viscosity ηsp/C=1.14, acid value=62 meq/kg), 19 parts by mass of polyethylene terephthalate resin (a-2) (produced by Mitsubishi Rayon Co., Ltd., trade name: DIANITE MA580D, intrinsic viscosity [η]=0.570), and 4.8 parts by mass of the acrylonitrile-styrene copolymer resin (x-1) obtained by the Production Example described above; as the inorganic filler, 4.8 parts by mass of settleable calcium carbonate (particles) subjected to a surface treatment with stearic acid (adhered amount: 2.2% by mass) (B1-1) (produced by Kamishima Chemical Industry, trade name: CAL-SEEDS, average particle diameter: 0.15 μm); as the releasing agent, 0.19 parts by mass of wax of glycerol triester of a montanic acid having 24 to 34 carbon atoms (produced by Clariant Japan Co., Ltd., trade name: Licolub WE4); and as the pigment, 0.25 parts by mass of carbon black (produced by Sumika Color Co., Ltd., trade name: BLACK BPM-8E756) were blended, homogenized by mixing them in a V type blender for 5 minutes, and then introduced to a vented twin-screw extruder having a diameter of 30 mm at a cylinder temperature of 260° C. to obtain pellets.

The pellets thus obtained were injection molded by using an injection molding machine (produced by Toshiba Corp. trade name: IS80FPB) under conditions of cylinder temperature of 260° C. and mold temperature of 80° C. into a mold for a flat plate of 100 mm square (the surface of which mold was polished in advance with a polishing agent having a polishing count of #14,000) to obtain a molded article (100 mm×100 mm, thickness 3 mm). Molding shrinkage (linear shrinkage) of the molded article thus obtained was 1.40%.

Next, aluminum was directly vapor deposited by the following procedures on the surface of the molded article obtained:

First, an inert gas and oxygen gas were introduced in an evacuated vapor depositing apparatus after the molded article was placed in the apparatus, the space within the chamber was made in a state, and a plasma activating treatment was conducted to activating the surface of the molded article. Then, aluminum was vapor deposited on the molded article in the evacuated vapor depositing apparatus. Plasma was generated by induced discharge in the chamber by passing current through an electrode which carries a target, ions in the plasma were spattered on the target, and then spatter particles, that is, aluminum particles sprung out from the target in turn were adhered on the surface of the molded article to form a film of deposited aluminum on the whole surface of the molded article. Thickness of the deposited aluminum film was 80 nm. Further, in order to form a protective film for the vapor deposited aluminum film, a plasma polymerization treatment was conducted. Plasma polymerization film was formed by introducing hexamethylenedisiloxane into the chamber under a vacuum plasma condition to form a film of silicon dioxide polymer. Film thickness of the silicon dioxide polymer was 50 nm.

By the procedures described above, a light reflector in which a light reflecting metal layer was directly formed on the surface of the molded article produced from the thermoplastic polyester type resin was obtained. When the diffused reflectance of the light reflector thus obtained was determined, the result was preferably 1.2%.

Next, when a heat resistance test for the light reflector was conducted, and then the diffused reflectance of the light reflector after the test was determined. Result was preferably 1.9%.

Examples 2 to 10

10 is a Typographical Mistake of 13

Pellets, molded articles, and light reflectors were obtained in the same manner as in Example 1 with the exception that the thermoplastic resin compositions having the chemical compositions shown in Table 1, respectively, were used. The results of evaluation were also shown in Table 1.

Comparative Examples 1 to 6

Pellets, molded articles, and light reflectors were obtained in the same manner as in Example 1 with the exception that the thermoplastic resin compositions having the chemical compositions shown in Table 2 were used. The results of evaluation were also shown in Table 2.

In the Tables 1 to 6 below, the following abbreviations are used:

Phys. prop.: Physical properties
Untreated: Surface was untreated.
AN-St: Acrylonitril-styrene
Ca: Calcium
Na: Sodium
Ba: Barium
α: Refractive index

TABLE 1

| | | | Example | | | | | | |
|---|---|---|---|---|---|---|---|---|---|
| | | | 1 | 2 | 3 | 4 | 5 | 6 | 7 |
| Composition | Thermoplastic resin | (a-1) Polybutylene terephthalate resin | 76.2 | 72.7 | 72.7 | 72.7 | 72.7 | 72.7 | 72.7 |
| | | (a-2) Polyethylene terephthalate resin | 19 | 18.2 | 18.2 | 18.2 | 18.2 | 18.2 | 18.2 |
| | | (x-1) AN-St copolymer resin | 4.8 | 9.1 | 9.1 | 9.1 | 9.1 | 9.1 | — |
| | | (x-2) Epoxy group containing AN-St copolymer resin | — | — | — | — | — | — | 9.1 |
| | | (x-3) Maleimide type copolymer resin | — | — | — | — | — | — | — |
| | Inorganic filler | (B1-1) Ca carbonate having surface treated with fatty acid (0.15 μm) | 4.8 | 9.1 | 22.7 | — | — | — | 9.1 |
| | | (B1-2) Kaolin having surface treated with fatty acid (0.4 μm) | — | — | — | 4.5 | 9.1 | 22.7 | — |
| | | (b1-3) Untreated talc (5.3 μm) | — | — | — | — | — | — | — |
| | | (b1-4) Untreated Ca carbonate (2.31 μm) | — | — | — | — | — | — | — |
| | | (b1-5) Untreated Ca carbonate (0.2 μm) | — | — | — | — | — | — | — |
| | | (b1-6) Talc having surface treated with epoxysilane (5.3 μm) | — | — | — | — | — | — | — |
| | Lubricant | Monoglyceride of fatty acid | — | — | — | — | — | — | — |
| | Release agent | Licolub WE4 (glycerol triester of montanic acid) | 0.19 | 0.18 | 0.19 | 0.18 | 0.18 | 0.18 | — |
| | | Licomont NaV101 (Na montanate) | — | — | — | — | — | — | 0.18 |
| | Other | Carbon black | 0.25 | 0.26 | 0.29 | 0.25 | 0.26 | 0.29 | 0.26 |
| Phys. prop. | Molded article | Release characteristics: Evaluation method 1 | ○ | ○ | ○ | ○ | ○ | ○ | ○ |
| | | Molding shrinkage (%) | 1.40 | 1.36 | 1.31 | 1.39 | 1.35 | 1.28 | 1.35 |
| | Light reflector | Appearance Immediately after vapor deposition | ○ | ○ | ○ | ○ | ○ | ○ | ○ |
| | | After heat resistance test | ○ | ○ | ○ | ○ | ○ | ○ | ○ |
| | | Diffused reflectance (%) Immediately after vapor deposition | 1.2 | 1.4 | 1.7 | 1.3 | 1.6 | 2.0 | 1.4 |
| | | After heat resistance test | 1.9 | 2.0 | 2.6 | 2.0 | 2.1 | 2.8 | 2.0 |

| | | | Example | | | | | |
|---|---|---|---|---|---|---|---|---|
| | | | 8 | 9 | 10 | 11 | 12 | 13 |
| Composition | Thermoplastic resin | (a-1) Polybutylene terephthalate resin | 72.7 | 54.6 | 72.7 | 72.7 | 54.6 | 80 |
| | | (a-2) Polyethylene terephthalate resin | 18.2 | 36.3 | 18.2 | 18.2 | 36.3 | 20 |
| | | (x-1) AN-St copolymer resin | — | — | — | — | — | — |
| | | (x-2) Epoxy group containing AN-St copolymer resin | 9.1 | 9.1 | — | — | — | — |
| | | (x-3) Maleimide type copolymer resin | — | — | 9.1 | 9.1 | 9.1 | — |
| | Inorganic filler | (B1-1) Ca carbonate having surface treated with fatty acid (0.15 μm) | 9.1 | 9.1 | 9.1 | 9.1 | 9.1 | 10 |
| | | (B1-2) Kaolin having surface treated with fatty acid 0.4 μm) | — | — | — | — | — | — |
| | | (b1-3) Untreated talc (5.3 μm) | — | — | — | — | — | — |
| | | (b1-4) Untreated Ca carbonate (2.31 μm) | — | — | — | — | — | — |
| | | (b1-5) Untreated Ca carbonate (0.2 μm) | — | — | — | — | — | — |
| | | (b1-6) Talc having surface treated with epoxysilane (5.3 μm) | — | — | — | — | — | — |
| | Lubricant | Monoglyceride of fatty acid | 0.27 | — | — | 0.27 | — | — |
| | Release agent | Licolub WE4 (glycerol triester of montanic acid) | — | 0.18 | 0.18 | — | 0.18 | 0.2 |
| | | Licomont NaV101 (Na montanate) | 0.18 | — | — | 0.18 | — | — |
| | Other | Carbon black | 0.26 | 0.26 | 0.26 | 0.26 | 0.26 | 0.26 |
| Phys. prop. | Molded article | Release characteristics: Evaluation method 1 | ○ | ○ | ○ | ○ | ○ | ○ |
| | | Molding shrinkage (%) | 1.35 | 1.33 | 1.36 | 1.36 | 1.34 | 1.52 |
| | Light reflector | Appearance Immediately after vapor deposition | ○ | ○ | ○ | ○ | ○ | ○ |
| | | After heat resistance test | ○ | ○ | ○ | ○ | ○ | ○ |
| | | Diffused reflectance (%) Immediately after vapor deposition | 1.5 | 1.4 | 1.4 | 1.5 | 1.4 | 1.8 |
| | | After heat resistance test | 2.1 | 2.0 | 2.0 | 2.1 | 2.0 | 2.2 |

TABLE 2

| | | | Comparative Example | | | | | |
|---|---|---|---|---|---|---|---|---|
| | | | 1 | 2 | 3 | 4 | 5 | 6 |
| Composition | Thermo-plastic resin | (a-1) Polybutylene terephthalate resin | 72.7 | 72.7 | 72.7 | 72.7 | 80 | 80 |
| | | (a-2) Polyethylene terephthalate resin | 18.2 | 18.2 | 18.2 | 18.2 | 20 | 20 |
| | | (x-1) AN-St copolymer resin | 9.1 | 9.1 | 9.1 | 9.1 | — | — |
| | | (x-2) Epoxy group containing AN-St copolymer resin | — | — | — | — | — | — |
| | | (x-3) Maleimide type copolymer resin | — | — | — | — | — | — |
| | Inorganic filler | (B1-1) Ca carbonate having surface treated with fatty acid (0.15 μm) | — | — | — | — | 1 | 50 |
| | | (B1-2) Kaolin having surface treated with fatty acid (0.4 μm) | — | — | — | — | — | — |
| | | (b1-3) Untreated talc (5.3 μm) | 9.1 | — | — | — | — | — |
| | | (b1-4) Untreated Ca carbonate (2.31 μm) | — | 9.1 | — | — | — | — |
| | | (b1-5) Untreated Ca carbonate (0.2 μm) | — | — | 9.1 | — | — | — |
| | | (b1-6) Talc having surface treated with epoxysilane (5.3 μm) | — | — | — | 9.1 | — | — |
| | Lubricant | Monoglyceride of fatty acid | — | — | — | — | — | — |
| | Release agent | Licolub WE4 (glycerol triester of montanic acid) | 0.18 | 0.18 | 0.18 | 0.18 | 0.2 | 0.2 |
| | | Licomont NaV101 (Na montanate) | — | — | — | — | — | — |
| | Other | Carbon black | 0.26 | 0.26 | 0.26 | 0.26 | 0.24 | 0.36 |
| Phys. prop. | Molded article | Release characteristics: Evaluation method 1 | ○ | ○ | ○ | X | X | ○ |
| | | Molding shrinkage (%) | 1.38 | 1.36 | 1.36 | 1.38 | 1.70 | 1.37 |
| | Light reflector | Appearance Immediately after vapor deposition | X | X | X | X | ○ | X |
| | | After heat resistance test | X | X | X | X | X | X |
| | | Diffued reflectance (%) Immediately after vapor deposition | 4.4 | 3.6 | 3.2 | 3.4 | 1.2 | 3.4 |
| | | After heat resistance test | 4.6 | 3.9 | 3.6 | 4.1 | 2.6 | 4.2 |

In the Examples and Comparative Examples shown in Tables 1 and 2, the materials described below were used.

(B1-1) Settleable calcium carbonate: Settleable calcium carbonate the surface of which was treated with stearic acid (2.2% by mass) (produced by Kamishima Chemical Industry, trade name: CALSEEDS P), average particle diameter=0.15 μm (determined by a transmission electron microscope method)

(B1-2) Kaolin: Hydrous kaolin the surface of which was treated with steric acid (0.5% by mass) (produced by ENGELHARD Corp., trade name: ASP-101), average particle diameter (median diameter)=0.4 μm (value determined by a laser diffraction method)

(b1-3) Talc: Talc the surface of which was untreated (produced by Hayashi Chemicals Co., Ltd., trade name: #5000S), average particle diameter (median diameter)=5.3 μm (value determined by a laser diffraction method)

(b1-4) Heavy calcium carbonate: Heavy calcium carbonate the surface of which was untreated (produced by TOYO FINE CHEMICALS CO., LTD., trade name: WHITON P-70), average particle diameter=2.31 μm (reduced value of BET specific surface area)

(b1-5) Settleable calcium carbonate: Settleable calcium carbonate the surface of which was untreated (produced by SHIRAISHI KOGYO KAISHA LTD. (Shiraishi Industry Co., Ltd., trade name: Brilliant-1500), average particle diameter=0.2 μm (reduced value of BET specific surface area)

(b1-6) Talc: Talc the surface of which was treated with γ-glycidoxypropyltrimethoxysilane (epoxysilane) (0.5% by mass) (produced by Hayashi Chemicals Co., Ltd., trade name: CHC-13S-05E), average particle diameter (median diameter)=5.3 μm (value determined by a laser diffraction method)

Wax of an ester of montanic acid having 24 to 34 carbon atoms: Wax (produced by Clariant Japan Co., Ltd., trade name: Licolub WE4)

Monoglyceride of fatty acid: Monoglyceride of fatty acid (produced by Riken Vitamin Co., Ltd., trade name: RIKEMAL S100A)

Sodium salt of montanic acid having 24 to 34 carbon atoms: Sodium salt of montanic acid (produced by Clariant Japan Co., Ltd., trade name: Licomont NaV101)

Example 14

As the thermoplastic resin (A), 76.2 parts by mass of polybutylene terephthalate resin (a-1) (produced by Mitsubishi Rayon Co., Ltd., trade name: TUFPET N1100, reduced viscosity $\eta sp/C$=1.14, acid value=62 meq/kg), 19 parts by mass of polyethylene terephthalate resin (a-2) (produced by Mitsubishi Rayon Co., Ltd., trade name: DIANITE MA580D, intrinsic viscosity $[\eta]$=0.570), and 4.8 parts by mass of the acrylonitrile-styrene copolymer resin (x-1) obtained in the Production Example 1; as the inorganic filler, 4.8 parts by mass of settleable barium sulfate (B2-1) (produced by Sakai Chemical Ind., trade name: B-30NC, average particle diameter: 0.3 μm, refractive index: 1.64); as the releasing agent, 0.19 parts by mass of wax of glycerol triester of a montanic acid having 24 to 34 carbon atoms (C1-1) (produced by Clariant Japan Co., Ltd., trade name: Licolub WE4); and as the pigment, 0.25 parts by mass of carbon black (produced by Sumika Color Co., Ltd., trade name: BLACK BPM-8E756) were blended, homogenized by mixing them in a V type blender for 5 minutes, and then introduced into a vented twin-screw extruder having a diameter of 30 mm, at a cylinder temperature of 260° C. to obtain pellets.

The pellets thus obtained were injection molded by using an injection molding machine (produced by Toshiba Corp., trade name: IS80FPB) under conditions of cylinder temperature of 260° C. and mold temperature of 80° C. into a mold for a flat plate of 100 mm square (the surface of which mold was polished in advance with a polishing agent having a polishing count of #14,000) to obtain a molded article (100 mm×100 mm, thickness 3 mm). Reflectance of the molded article was 74% at a wave length of 420 nm. Molding shrinkage of the molded article was 1.40%.

Next, aluminum was directly vapor deposited by the following procedures on the surface of the molded article obtained:

First, an inert gas and oxygen gas were introduced in an evacuated vapor depositing apparatus after the molded article was placed in the apparatus, the space within the chamber was made in a plasma state, and a plasma activating treatment was conducted to activating the surface of the molded article. Then, aluminum was vapor deposited in an evacuated vapor depositing apparatus. Plasma was generated by induced discharge in the chamber by passing current through an electrode which carries a target, ions in the plasma were spattered on the target, and then spatter particles, that is, aluminum particles sprung out from the target in turn were adhered on the surface of the molded article to form a film of deposited aluminum on the whole surface of the molded article. Thickness of the deposited aluminum vapor was 80 nm. Further, in order to form a protective film for the vapor deposited aluminum film, a plasma polymerization treatment was conducted. Plasma polymerization film was formed by introducing hexamethylenedisiloxane into the chamber under a vacuum plasma condition to form a film of silicon dioxide polymer. Film thickness of the silicon dioxide polymer was 50 nm.

By the procedures described above, a light reflector in which a light reflecting metal layer was directly formed on the surface of the molded article produced from the thermoplastic polyester type resin was obtained. When the diffused reflectance of the light reflector thus obtained was determined, the result was preferably 1.2%.

Next, when a heat resistance test for the light reflector was conducted and the diffused reflectance of the light reflector after the test was determined, the result was preferably 1.9%.

Examples 15 through 26

Example 14 was repeated with the exception that the thermoplastic resin compositions having the chemical compositions shown in Table 3, respectively, were used to obtain pellets, molded articles, and light reflectors. Results of the evaluation are also shown in Table 3.

Comparative Examples 7 to 9

Example 14 was repeated with the exception that the thermoplastic resin compositions having the chemical compositions shown in Table 4, respectively, were used to obtain pellets, molded articles, and light reflectors. Results of the evaluation are also shown in Table 4.

TABLE 3

| | | | | Example | | | | |
|---|---|---|---|---|---|---|---|---|
| | | | | 14 | 15 | 16 | 17 | 18 |
| Composition | Thermoplastic resin | (a-1) Polybutylene terephthalate resin | | 76.2 | 72.7 | 72.7 | 72.7 | 72.7 |
| | | (a-2) Polyethylene terephthalate resin | | 19 | 18.2 | 18.2 | 18.2 | 18.2 |
| | | (x-1) AN-St copolymer resin | | 4.8 | 9.1 | 9.1 | 9.1 | 9.1 |
| | | (x-2) Epoxy group containing AN-St copolymer resin | | — | — | — | — | — |
| | | (x-3) Maleimide type copolymer resin | | — | — | — | — | — |
| | Inorganic filler | (B2-1) Settleable Ba sulfate (0.3 μm) α = 1.64 | | 4.8 | 9.1 | 22.7 | — | — |
| | | (B2-2) Settleable Ba sulfate (0.1 μm) α = 1.64 | | — | — | — | 4.5 | 9.1 |
| | | (b2-3) Untreated talc (5.3 μm) α = 1.56 | | — | — | — | — | — |
| | Lubricant | Monoglyceride of fatty acid | | — | — | — | — | — |
| | Release agent | Licolub WE4 (glycerol triester of montanic acid) | | 0.19 | 0.18 | 0.19 | 0.18 | 0.18 |
| | | Licomont NaV101 (sodium montanate) | | — | — | — | — | — |
| | Other | Carbon black | | 0.25 | 0.26 | 0.29 | 0.25 | 0.26 |
| Phys. prop. | Molded article | Release characteristics: Evaluation method 1 | | ○ | ○ | ○ | ○ | ○ |
| | | Molding shrinkage (%) | | 1.40 | 1.36 | 1.31 | 1.39 | 1.35 |
| | | Reflectance at 420 nm | | 74.0 | 72.3 | 71.4 | 74.2 | 72.5 |
| | | Reflectance at 560 nm | | 82.0 | 81.6 | 79.8 | 82.3 | 82.0 |
| | | Reflectance at 700 nm | | 82.5 | 82.3 | 81.4 | 82.6 | 82.4 |
| | Light reflector | Appearance | Immediately after vapor deposition | Release mark | ○ | ○ | ○ | ○ | ○ |
| | | | | Orange peel like defect | ○ | ○ | ○ | ○ | ○ |
| | | | | Whitening | ○ | ○ | ○ | ○ | ○ |
| | | | | Deformation | ○ | ○ | ○ | ○ | ○ |
| | | | | Reflectance appearance | ○ | ○ | ○ | ○ | ○ |
| | | | After heat resistance test | Release mark | ○ | ○ | ○ | ○ | ○ |
| | | | | Orange peel like defect | ○ | ○ | ○ | ○ | ○ |
| | | | | Whitening | ○ | ○ | ○ | ○ | ○ |
| | | | | Deformation | ○ | ○ | ○ | ○ | ○ |
| | | | | Reflectance appearance | ○ | ○ | ○ | ○ | ○ |
| | | Diffused reflectance (%) | Immediately after vapor deposition | | 1.2 | 1.3 | 1.5 | 1.3 | 1.4 |
| | | | After heat resistance test | | 1.9 | 1.9 | 2.1 | 1.9 | 1.9 |

TABLE 3-continued

|  |  |  |  | Example | | | |
|---|---|---|---|---|---|---|---|
|  |  |  |  | 19 | 20 | 21 | 22 |
| Composition | Thermo-plastic resin | (a-1) Polybutylene terephthalate resin | | 72.7 | 72.7 | 72.7 | 54.6 |
|  |  | (a-2) Polyethylene terephthalate resin | | 18.2 | 18.2 | 18.2 | 36.3 |
|  |  | (x-1) AN-St copolymer resin | | 9.1 | — | — | — |
|  |  | (x-2) Epoxy group containing AN-St copolymer resin | | — | 9.1 | 9.1 | 9.1 |
|  |  | (x-3) Maleimide type copolymer resin | | — | — | — | — |
|  | Inorganic filler | (B2-1) Settleable Ba sulfate (0.3 μm) α = 1.64 | | — | 9.1 | 9.1 | 9.1 |
|  |  | (B2-2) Settleable Ba sulfate (0.1 μm) α = 1.64 | | 22.7 | — | — | — |
|  |  | (b2-3) Untreated talc (5.3 μm) α = 1.56 | | — | — | — | — |
|  | Lubricant | Monoglyceride of fatty acid | | — | — | 0.27 | — |
|  | Releae agent | Licolub WE4 (glycerol triester of montanic acid) | | 0.18 | — | — | 0.18 |
|  |  | Licomont NaV101 (sodium montanate) | | — | 0.18 | 0.18 | — |
|  | Other | Carbon black | | 0.29 | 0.26 | 0.26 | 0.26 |
| Phys. prop. | Molded article | Release characteristics: Evaluation method 1 | | ○ | ○ | ○ | ○ |
|  |  | Molding shrinkage (%) | | 1.28 | 1.35 | 1.35 | 1.33 |
|  |  | Reflectance at 420 nm | | 71.8 | 72.1 | 72.5 | 72.5 |
|  |  | Reflectance at 560 nm | | 80.0 | 81.4 | 81.4 | 81.5 |
|  |  | Reflectance at 700 nm | | 81.6 | 82.1 | 82.0 | 82.4 |
|  | Light reflector | Appearance | Imme-diately after vapor deposition | Release mark | ○ | ○ | ○ | ○ |
|  |  |  |  | Orange peel like defect | ○ | ○ | ○ | ○ |
|  |  |  |  | Whitening | ○ | ○ | ○ | ○ |
|  |  |  |  | Deformation | ○ | ○ | ○ | ○ |
|  |  |  |  | Reflectance appearance | ○ | ○ | ○ | ○ |
|  |  |  | After heat resistance test | Release mark | ○ | ○ | ○ | ○ |
|  |  |  |  | Orange peel like defect | ○ | ○ | ○ | ○ |
|  |  |  |  | Whitening | ○ | ○ | ○ | ○ |
|  |  |  |  | Deformation | ○ | ○ | ○ | ○ |
|  |  |  |  | Reflectance appearance | ○ | ○ | ○ | ○ |
|  |  | Diffused reflectance (%) | Immediately after vapor deposition | 1.7 | 1.4 | 1.5 | 1.4 |
|  |  |  | After heat resistance test | 2.4 | 2.0 | 2.1 | 1.9 |

|  |  |  |  | Example | | | |
|---|---|---|---|---|---|---|---|
|  |  |  |  | 23 | 24 | 25 | 26 |
| Composition | Thermo-plastic resin | (a-1) Polybutylene terephthalate resin | | 72.7 | 72.7 | 54.6 | 80 |
|  |  | (a-2) Polyethylene terephthalate resin | | 18.2 | 18.2 | 36.3 | 20 |
|  |  | (x-1) AN-St copolymer resin | | — | — | — | — |
|  |  | (x-2) Epoxy group containing AN-St copolymer resin | | — | — | — | — |
|  |  | (x-3) Maleimide type copolymer resin | | 9.1 | 9.1 | 9.1 | — |
|  | Inorganic filler | (B2-1) Settleable Ba sulfate (0.3 μm) α = 1.64 | | 9.1 | 9.1 | 9.1 | 10 |
|  |  | (B2-2) Settleable Ba sulfate (0.1 μm) α = 1.64 | | — | — | — | — |
|  |  | (b2-3) Untreated talc (5.3 μm) α = 1.56 | | — | — | — | — |
|  | Lubricant | Monoglyceride of fatty acid | | — | 0.27 | — | — |
|  | Releae agent | Licolub WE4 (glycerol triester of montanic) | | 0.18 | — | 0.18 | 0.2 |
|  |  | Licomont NaV101 (sodium montanate) | | — | 0.18 | — | — |
|  | Other | Carbon black | | 0.26 | 0.26 | 0.26 | 0.26 |
| Phys. prop. | Molded article | Release characteristics: Evaluation method 1 | | ○ | ○ | ○ | ○ |
|  |  | Molding shrinkage (%) | | 1.36 | 1.36 | 1.34 | 1.52 |
|  |  | Reflectance at 420 nm | | 72.5 | 71.8 | 72.2 | 71.6 |
|  |  | Reflectance at 560 nm | | 81.3 | 80.6 | 81.7 | 80.8 |
|  |  | Reflectance at 700 nm | | 82.2 | 81.9 | 82.4 | 81.7 |
|  | Light reflector | Appearance | Imme-diately after vapor deposition | Release mark | ○ | ○ | ○ | ○ |
|  |  |  |  | Orange peel like defect | ○ | ○ | ○ | ○ |
|  |  |  |  | Whitening | ○ | ○ | ○ | ○ |
|  |  |  |  | Deformation | ○ | ○ | ○ | ○ |
|  |  |  |  | Reflectance appearance | ○ | ○ | ○ | ○ |
|  |  |  | After heat resistance test | Release mark | ○ | ○ | ○ | ○ |
|  |  |  |  | Orange peel like defect | ○ | ○ | ○ | ○ |
|  |  |  |  | Whitening | ○ | ○ | ○ | ○ |
|  |  |  |  | Deformation | ○ | ○ | ○ | ○ |
|  |  |  |  | Reflectance appearance | ○ | ○ | ○ | ○ |
|  |  | Diffused reflectance (%) | Immediately after vapor deposition | 1.4 | 1.5 | 1.4 | 1.7 |
|  |  |  | After heat resistance test | 2.0 | 2.1 | 2.0 | 2.3 |

TABLE 4

|  |  |  | Comparative Examples | | |
|---|---|---|---|---|---|
|  |  |  | 7 | 8 | 9 |
| Composition | Thermoplastic resin | (a-1) Polybutylene terephthalate resin | 72.7 | 80 | 80 |
|  |  | (a-2) Polyethylene terephthalate resin | 18.2 | 20 | 20 |
|  |  | (x-1) AN-St copolymer resin | 9.1 | — | — |
|  |  | (x-2) Epoxy group containing AN-St copolymer resin | — | — | — |
|  |  | (x-3) Maleimide type copolymer resin | — | — | — |
|  | Inorganic filler | (B2-1) Settleable Ba sulfate (0.3 μm) α = 1.64 | — | 1 | 50 |
|  |  | (B2-2) Settleable Ba sulfate (0.1 μm) α = 1.64 | — | — | — |
|  |  | (b2-3) Untreated talc (5.3 μm) α = 1.56 | 9.1 | — | — |
|  | Lubricant | Monoglyceride of fatty acid | — | — | — |
|  | Release agent | Licolub WE4 (glycerol triester of montanic acid) | 0.18 | 0.2 | 0.2 |
|  |  | Licomont NaV101 (sodium montanate) | — | — | — |
|  | Other | Carbon black | 0.26 | 0.24 | 0.36 |
| Phys. prop. | Molded article | Release characteristics: Evaluation method 1 | ○ | X | ○ |
|  |  | Molding shrinkage (%) | 1.36 | 1.70 | 1.37 |
|  |  | Reflectance at 420 nm | 55.8 | 76.4 | 51.6 |
|  |  | Reflectance at 560 nm | 58.6 | 82.2 | 59.7 |
|  |  | Reflectance at 700 nm | 59.9 | 82.4 | 61.1 |
|  | Light reflector | Appearance Immediately after vapor deposition — Release mark | ○ | X | ○ |
|  |  | Orange peel like defect | X | ○ | X |
|  |  | Whitening | ○ | ○ | ○ |
|  |  | Deformation | ○ | X | ○ |
|  |  | Reflectance appearance | X | ○ | ○ |
|  |  | After heat resistance test — Release mark | ○ | X | ○ |
|  |  | Orange peel like defect | X | ○ | X |
|  |  | Whitening | X | ○ | X |
|  |  | Deformation | ○ | X | ○ |
|  |  | Reflectance appearance | X | ○ | ○ |
|  |  | Diffused reflectance (%) Immediately after vapor deposition | 3.3 | 1.2 | 3.4 |
|  |  | After heat resistance test | 4.1 | 2.6 | 4.2 |

In the Examples and Comparative Examples shown in Tables 3 and 4, the materials described below were used:

(B2-1) Settleable barium sulfate: Product of Sakai Chemical Ind., trade name: B-30NC, average particle diameter=0.3 μm (determined by transmission electron microscope method), refractive index=1.64.

(B2-2) Settleable barium sulfate: Product of Sakai Chemical Ind., trade name: SS-50, average particle diameter=0.1 μm (determined by transmission electron microscope method), refractive index=1.64

(b2-3) Talc: Talc having an untreated surface (produced by Hayashi Chemicals Co., Ltd., trade name: #5000S), average particle diameter (median diameter)=5.3 μm (value determined by a laser diffraction method), refractive index=1.56.

Wax of an ester of montanic acid having 24 to 34 carbon atoms: Product of Clariant Japan Co., Ltd., trade name: Licolub WE4

Sodium montanate having 24 to 34 carbon atoms: Product of Clariant Japan Co., Ltd., trade name: Licomont NaV101

Monoglyceride of fatty acid: Product of Riken Vitamin Co., Ltd., trade name: RIKEMAL S100A

Example 27

As the thermoplastic resin (A), 80 parts by mass of polybutylene terephthalate resin (a-1) (produced by Mitsubishi Rayon Co., Ltd., trade name: TUFPET N1300, reduced viscosity ηsp/C=1.01, acid value=42 meq/kg), and 20 parts by mass of polyethylene terephthalate resin (a-2) (produced by Mitsubishi Rayon Co., Ltd., trade name: DIANITE MA521H-D, intrinsic viscosity [η]=0.780; as the (C1) component, 0.2 parts by mass of glycerol triester of montanic acid (C1-1) (produced by Clariant Japan Co., Ltd., trade name: Licolub WE4); as the (C2) component, glycerol monoester of stearic acid (C2-1) (produced by Riken Vitamin Co., Ltd., trade name: RIKEMAL S100); as the nucleating agent, 1 part by mass of talc (produced by Hayashi Chemicals Co., Ltd., trade name: #SG200, average particle diameter=4.4 μm) the surface of which was treated with γ-glycidoxypropyltrimethoxysilane (0.5% by mass); and as the pigment, 0.24 parts by mass of carbon black (produced by Sumika Color Co., Ltd., trade name: BLACK BPM-8E756 were blended, homogenized by mixing them in a V type blender for 5 minutes, and then introduced into a vented twin-screw extruder having a diameter of 30 mm, at a cylinder temperature of 260° C. to obtain pellets.

When the release characteristics were tested by using the pellets thus obtained according to evaluation method 2, the release characteristics were confirmed to be excellent.

Separately, the pellets were injection molded by using an injection molding machine (produced by Toshiba Corp. trade name: IS80FPB) under conditions of a cylinder temperature of 260° C. and mold temperature of 80° C. into a mold for a flat plate of 100 mm square (the surface of which was polished in advance with a polishing agent having a polishing count of #14,000, arithmetic mean surface roughness Ra=0.03 μm) to obtain a flat molded article (100 mm×100 mm) for a light reflector. Image clarity of the flat molded article thus obtained was 98.2%.

Next, when the fogging properties of the molded article of this Example were evaluated by using the flat molded article of 100 mm square obtained, the haze value was 27%.

Further, aluminum was directly vapor deposited by the procedures described below on the surface of the flat molded article of 100 mm square obtained:

First, an inert gas and oxygen gas were introduced in an evacuated vapor depositing apparatus after the molded article was placed in the apparatus, the space within the chamber was made in a plasma state, and a plasma activating treatment was conducted to activating the surface of the molded article. Then, aluminum was vapor deposited on the molded article in the evacuated vapor depositing apparatus. Plasma was generated by induced discharge in the chamber by passing current through an electrode which carries a target, ions in the plasma were spattered on the target, and then spatter particles, that is, aluminum particles sprung out from the target in turn were adhered on the surface of the molded article to form a film of vapor deposited aluminum on the whole surface of the molded article. Thickness of the deposited aluminum film was 80 nm. Further, in order to form a protective film for the vapor deposited aluminum film, a plasma polymerization treatment was conducted. Plasma polymerization film was formed by introducing hexamethylenedisiloxane into the chamber under a vacuum plasma condition to form a film of silicon dioxide polymer. Film thickness of the silicon dioxide polymer was 50 nm.

By the procedures described above, a light reflector in which a light reflecting metal layer was directly formed on the surface of the molded article produced from the thermoplastic polyester type resin was obtained. Diffused reflectance of the light reflector thus obtained was evaluated, and the results are shown in Tables 5 and 7.

Next, a heat resistance test for the light reflector obtained was conducted, and the evaluation results of the light reflector after the test are shown in Table 5.

Examples 28 to 31

Example 27 was repeated with the exception that the thermoplastic resin compositions having the chemical compositions shown in Table 5, respectively, were used to obtain pellets, molded articles, and light reflectors. Results of the evaluation are also shown in Table 5.

Comparative Examples 10 to 20

Example 27 was repeated with the exception that the thermoplastic resin compositions having the chemical compositions shown in Table 6, respectively, were used to obtain pellets, molded articles, and light reflectors. Results of the evaluation are also shown in Table 6.

TABLE 5

| Composition | | | | Example 27 | Example 28 | Example 29 | Example 30 | Example 31 |
|---|---|---|---|---|---|---|---|---|
| Composition | Resin | (a-1) Polybutylene terephthalate resin | | 80 | 80 | 80 | 80 | 100 |
| | | (a-2) Polyethylene terephthalate resin | | 20 | 20 | 20 | 20 | — |
| | Nucleating agent | Talc having surface treated with epoxysilane (4.4 μm) | | 1.0 | — | — | — | — |
| | | Talc having surface treated with epoxysilane (0.9 μm) | | — | 1.0 | — | — | — |
| | | Kaolin having surface treated with fatty acid (0.4 μm) | | — | — | 1.0 | — | — |
| | Release agent | (C1-1) Glycerol triester of montanic acid | | 0.2 | 0.2 | 0.2 | 0.2 | 0.2 |
| | | (c-3) Sodium montanate | | — | — | — | — | — |
| | | (c-4) Calcium montanate | | — | — | — | — | — |
| | | (c-5) Pentaerythrytol tetraester of montanic acid | | — | — | — | — | — |
| | | (c-6) Ethyleneglycol diester of montanic acid | | — | — | — | — | — |
| | | (c-7) Partially saponified ester of montanic acid | | — | — | — | — | — |
| | Lubricant | (C2-1) Glycerol monoester of stearic acid | | 0.3 | 0.3 | 0.3 | 0.3 | 0.3 |
| | Other | Sodium benzoate | | — | — | — | — | — |
| | | Carbon black | | 0.24 | 0.24 | 0.24 | 0.24 | 0.24 |
| Phys. prop. | Molded article | Release characteristics (Release force: N): Evaluation method 2 | | 345 | 365 | 360 | 415 | 376 |
| | | Fogging properties (haze: %) | | 18 | 17 | 16 | 19 | 18 |
| | Light reflector | Checkers release test (number of released checkers: 96) | Before heat resistance test | 100 | 100 | 100 | 100 | 100 |
| | | | After heat resistance test | 100 | 100 | 100 | 100 | 100 |
| | | Before heat resistance test | Orange peel like defect | ◎ | ◎ | ◎ | ◎ | ◎ |
| | | | Whitening | ◎ | ◎ | ◎ | ◎ | ◎ |
| | | | Release mark | ◎ | ◎ | ◎ | ◎ | ◎ |
| | | After heat resistance test | Orange peel like defect | ◎ | ◎ | ◎ | ◎ | ◎ |
| | | | Whitening | ◎ | ◎ | ◎ | ◎ | ◎ |
| | | | Release mark | ◎ | ◎ | ◎ | ○ | ○ |
| | | Diffsed reflectance (%) | Before heat resistance test | 1.4 | 1.5 | 1.4 | 1.3 | 1.4 |
| | | | After heat resistance test | 2.0 | 2.1 | 2.2 | 2.3 | 2.5 |

TABLE 6

| | | | Comparative Examples | | | | | |
|---|---|---|---|---|---|---|---|---|
| | | | 10 | 11 | 12 | 13 | 14 | 15 |
| Composition | Resin | (a-1) Polybutylene terephthalate resin | 80 | 80 | 80 | 80 | 80 | 80 |
| | | (a-2) Polyethylene terephthalate resin | 20 | 20 | 20 | 20 | 20 | 20 |

TABLE 6-continued

|  |  |  |  |  |  |  |  |  |
|---|---|---|---|---|---|---|---|---|
|  | Inorganic filler | Talc with surface treated by epoxysilane (4.4 μm) | — | 1.0 | 1.0 | — | 1.0 | 1.0 |
|  |  | Talc with surface treated by epoxysilane (0.9 μm) | — | — | — | — | — | — |
|  |  | Kaolin with surface treated by fatty acid (0.4 μm) | — | — | — | — | — | — |
|  | Release agent | (C1-1) Glycerol triester of montanic acid | — | — | — | — | — | — |
|  |  | (c-3) Sodium montanate | — | — | — | — | — | — |
|  |  | (c-4) Calcium montanate | — | — | — | — | 0.2 | — |
|  |  | (c-5) Pentaerythritol tetraester of montanic acid | — | — | — | — | — | 0.2 |
|  |  | (c-6) Ethylene glycol diester of montanic acid | — | — | — | — | — | — |
|  |  | (c-7) Partially saponified ester of montanic acid | — | — | — | — | — | — |
|  | Lubricant | (C2-1) Glycerol monoester of stearic acid | — | — | 0.3 | 0.3 | — | — |
|  | Other | Sodium benzoate | — | — | — | — | — | — |
|  |  | Carbon black | 0.24 | 0.24 | 0.24 | 0.24 | 0.24 | 0.24 |
| Phys. prop. | Molded article | Release characteristics (release force: N): Evaluation method 2 | 1633 | 1560 | 880 | 1030 | 393 | 574 |
|  |  | Fogging properties (haze: %) | 18 | 21 | 17 | 16 | 26 | 28 |
|  | Light reflector | Checkers release test (No. of released checkers: 96) Before heat resistance test | 100 | 100 | 100 | 100 | 100 | 100 |
|  |  | After heat resistance test | 100 | 100 | 100 | 100 | 100 | 100 |
|  |  | Appearance Before heat resistance test — Orange peel defect | ◎ | ◎ | ◎ | ◎ | ◎ | ◎ |
|  |  | Whitening | ◎ | ◎ | ◎ | ◎ | ◎ | ◎ |
|  |  | Release mark | ◎ | ◎ | ◎ | ◎ | ◎ | ◎ |
|  |  | After heat resistance test — Orange peel defect | ◎ | ◎ | ◎ | ◎ | ◎ | ◎ |
|  |  | Whitening | ◎ | ◎ | ◎ | ◎ | X | ○ |
|  |  | Release mark | X | Δ | ○ | Δ | ◎ | ○ |
|  |  | Diffused reflectance (%) Before heat resistance test | 1.5 | 1.8 | 1.4 | 1.5 | 1.6 | 1.8 |
|  |  | After heat resistance test | 4.5 | 3.3 | 2.8 | 3.6 | 6.9 | 2.8 |

|  |  |  | Comparative Example |  |  |  |  |
|---|---|---|---|---|---|---|---|
|  |  |  | 16 | 17 | 18 | 19 | 20 |
| Composition | Resin | (a-1) Polybutylene terephthalate resin | 80 | 80 | 80 | 80 | 80 |
|  |  | (a-2) Polyethylene terephthalate resin | 20 | 20 | 20 | 20 | 20 |
|  | Inorganic filler | Talc with surface treated by epoxysilane (4.4 μm) | 1.0 | 1.0 | 1.0 | 1.0 | 1.0 |
|  |  | Talc with surface treated by epoxysilane (0.9 μm) | — | — | — | — | — |
|  |  | Kaolin with surface treated by fatty acid (0.4 μm) | — | — | — | — | — |
|  | Release agent | (C1-1) Glycerol triester of montanic acid | — | — | 0.2 | 0.1 | 0.2 |
|  |  | (c-3) Sodium montanate | — | — | — | 0.1 | — |
|  |  | (c-4) Calcium montanate | — | — | — | — | — |
|  |  | (c-5) Pentaerythritol tetraester of montanic acid | — | — | — | — | — |
|  |  | (c-6) Ethylene glycol diester of montanic acid | 0.2 | — | — | — | — |
|  |  | (c-7) Partially saponified ester of montanic acid | — | 0.2 | — | — | — |
|  | Lubricant | (C2-1) Glycerol monoester of stearic acid | — | — | — | — | — |
|  | Other | Sodium benzoate | — | — | — | — | 0.1 |
|  |  | Carbon black | 0.24 | 0.24 | 0.24 | 0.24 | 0.24 |
| Phys. prop. | Molded article | Release characteristics (release force: N): Evaluation method 2 | 404 | 372 | 406 | 426 | 404 |
|  |  | Fogging properties (haze: %) | 24 | 23 | 27 | 31 | 38 |
|  | Light reflector | Checkers release test (No. of released checkers: 96) Before heat resistance test | 95 | 100 | 100 | 100 | 100 |
|  |  | After heat resistance test | 70 | 95 | 100 | 100 | 100 |
|  |  | Appearance Before heat resistance test — Orange peel defect | ◎ | ◎ | ◎ | ◎ | ◎ |
|  |  | Whitening | ◎ | ◎ | ◎ | ◎ | ◎ |
|  |  | Release mark | ◎ | ◎ | ◎ | ◎ | ◎ |
|  |  | After heat resistance test — Orange peel defect | ◎ | ◎ | ◎ | ◎ | ◎ |
|  |  | Whitening | X | X | ◎ | ◎ | ◎ |
|  |  | Release mark | ◎ | ◎ | ◎ | ◎ | ◎ |
|  |  | Diffused reflectance (%) Before heat resistance test | 1.7 | 1.5 | 1.5 | 1.5 | 1.3 |
|  |  | After heat resistance test | 6.6 | 10.5 | 2.2 | 2.2 | 2.0 |

In the Examples and Comparative Examples shown in Tables 5 and 6, the materials described below were used.

(C1-1) Glycerol triester of montanic acid: Product of Clariant Japan Co., Ltd., trade name: Licolub WE4

(C2-1) Glycerol monoester of montanic acid: Product of Riken Vitamin Co., Ltd., trade name: RIKEMAL S100A (c-3) Sodium montanate: Product of Clariant Japan Co., Ltd., trade name: Licomont NaV (c-4) Calcium montanate: Product of Clariant Japan Co., Ltd., tradename: CaV102

(c-5) Pentaerythritol tetraester of montanic acid: Product of Clariant Japan Co., Ltd., trade name: Licolub WE40

(c-6) Ethylene glycol diester of montanic acid: Product of Clariant Japan Co., Ltd., trade name: Licowax E (c-7) Partially saponified ester of montanic acid (mixture of butylene glycol ester of montanic acid and calcium montanate): Product of Clariant Japan Co., Ltd., trade name: Licowax OP Talc (average particle diameter: 4.4 μm): Product of Hayashi Chemicals Co., Ltd., produced by surface treating a talc having a trade name of #SG200 with γ-glycidoxypropyltrimethoxysilane (0.5% by mass)

Talc (average particle diameter: 0.9 μm): Product of Hayashi Chemicals Co., Ltd., produced by surface treating a talc having a trade name #SG2000 with γ-glycidoxypropyltrimethoxysilane (epoxysilane) (0.5% by mass)

Kaolin (average particle diameter: 0.4 μm): Hydrokaolin produced by ENGELHARD CORPORATION, trade name: ASP-101

Sodium benzoate: Product of Wako Pure Chemical Industries, Ltd.

Example 32

Pellets of Example 27 were injection molded with an injection molding machine (produced by Toshiba Corp., trade name: IS80FPB) under conditions of a cylinder temperature of 260° C. and mold temperature of 80° C. into a mold for a flat plate of 100 mm square (the surface of which mold was polished in advance with a polishing agent having a polishing count of #8000, arithmetic mean surface roughness Ra=0.04 μm) to obtain a flat molded article (100 mm×100 mm) for a light reflector. Aluminum was directly vapor deposited on the surface of the flat molded article of 100 mm square thus obtained in the same manner as in Example 27 to obtain a light reflector. Image clarity of the light reflector thus obtained and that of the molded article are shown in Table 7.

Example 33

Example 32 was repeated with the exception that a mold having the surface polished with a polishing agent having a polishing count of #5000 (arithmetic mean surface roughness Ra=0.06 μm) was used as mold for a flat plate to obtain a light reflector. Image clarity of the light reflector thus obtained and the molded article are shown in Table 7

Comparative Example 21

Example 32 was repeated with the exception that a mold having the surface polished with a polishing agent having a polishing count of #3000 (arithmetic mean surface roughness Ra=0.08 μm) was used to obtain a light reflector. Image clarity of the light reflector thus obtained and the molded article are shown in Table 7.

Comparative Example 22

Example 32 was repeated with the exception that a mold having the surface polished with a polishing agent having a polishing count of #800 (arithmetic mean surface roughness Ra=0.13 μm) was used to obtain a light reflector. Image clarity of the light reflector thus obtained and the molded article are also shown in Table 7.

TABLE 7

|  |  | Example 27 | Example 32 | Example 33 | Comp. Example 21 | Comp. Example 22 |
| --- | --- | --- | --- | --- | --- | --- |
| Arithmetic mean surface roughness Ra (μm) |  | 0.03 | 0.04 | 0.06 | 0.08 | 0.13 |
| Count of polishing agent for mold |  | #14000 | #8000 | #5000 | #3000 | #800 |
| Image clarity (%) | Molded article | 98.2 | 96.7 | 95.8 | 89.8 | 89.5 |
|  | Light reflector | 98.3 | 96.8 | 95.6 | 89.9 | 89.7 |

INDUSTRIAL APPLICABILITY

Light reflector of the present invention is excellent in surface smoothness. Light reflector of the present invention exhibits such a feature as the development of the thermal tarnishing (orange peel like defect and whitening) on the surface of a light reflecting metal surface formed by direct vapor deposition method is small even when heated under a condition of 160° C. Light reflector of the present invention has a characteristic of being excellent in low fogging properties. Light reflector of the present invention has a sharp reflection appearance and an excellent appearance. Also, the light reflector of the present invention is excellent in image clarity. Further, the molded article for a light reflector of the present invention is excellent in release characteristics. Still further, the molded article for a light reflector of the present invention has a characteristic of having a small molding shrinkage.

Accordingly, the light reflector of the present invention can suitably be used as a light reflector of a housing, reflector, or extension of an automotive lamp, or as a light reflector of a lamp case for illuminating a household electrical appliance. Furthermore, since the thermoplastic resin composition for a light reflector of the present invention is excellent in the fluidity at the time of molding, it is sufficient to provide a small number of gates to a mold. Thus, the thermoplastic resin composition of the present invention provides such advantages that the freedom in designing a mold and the freedom at the time of preparing a mold are increased.

The invention claimed is:

1. A light reflector, comprising:

a light reflecting metal layer; and a molded article having a surface;

wherein the light reflecting metal layer is directly formed on at least a part of the surface of the molded article, and the molded article comprises:

a thermoplastic resin (A) at least one of an ester of a fatty acid and a salt of fatty acid in an amount of from 0.01 to 3 parts by mass with respect to 100 parts by mass of the thermoplastic resin (A); and 2 to 45 parts by mass of precipitated barium sulfate per 100 parts by mass of the thermoplastic resin (A);

wherein the thermoplastic resin (A) contains a polyester resin (a), the polyester resin (a) contains a polybutylene terephthalate (a-1) and a polyethylene terephthalate (a-2), an amount of the polyester (a) is 85% by mass or more with respect to a total mass of the thermoplastic resin (A), a refractive index ($\alpha$) of the precipitated barium sulfate is from 1.64 to 1.65, an average particle diameter of the precipitated barium sulfate is 3 μm or less, and a diffused reflectance of the light reflector after a heat resistance test is not more than 3%.

2. The light reflector according to claim 1 wherein the average particle diameter of the precipitated barium sulfate is not more than 1 μm.

3. The light reflector according to claim 1, wherein the thermoplastic resin (A) further comprises 3 to 15% by mass of a vinyl thermoplastic resin (x).

4. The light reflector according to claim 1, wherein the molded article comprises the fatty acid ester and the fatty acid ester is at least one glycerol ester selected from the group consisting of a glycerol triester of a fatty acid and a glycerol diester of a fatty acid.

5. The light reflector according to claim 1 wherein the molded article has at all times a light reflectance, at the surface of the molded article, of 65% or more at a wave length of light in the range of from 420 to 700 nm and has a linear shrinkage of not more than 1.6%.

6. The light reflector according to claim 5 wherein the light reflectance, at the surface of the molded aticle is 70% or more at a wage length of light in the range of from 420 to 700 nm.

7. The light reflector according to claim 1, wherein an amount of the polyester resin (a) is 90% by mass or more with respect to the total mass of the thermoplastic resin (A) of the molded article.

* * * * *